(12) United States Patent
Tomita et al.

(10) Patent No.: US 9,552,014 B2
(45) Date of Patent: Jan. 24, 2017

(54) ELECTRONIC APPARATUS

(71) Applicant: SONY CORPORATION, Tokyo (JP)

(72) Inventors: Takahiro Tomita, Nagano (JP);
Takashi Sonehara, Nagano (JP);
Minoru Shimizu, Kanagawa (JP);
Takuya Motoishi, Tokyo (JP); Naoki Ogishita, Tokyo (JP); Yuuki Kubota, Tokyo (JP); Ryousuke Tobiyama, Nagano (JP); Masanobu Yamaguchi, Nagano (JP); Kouichi Hiroyoshi, Nagano (JP); Kazuaki Takahashi, Nagano (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/047,681

(22) Filed: Feb. 19, 2016

(65) Prior Publication Data

US 2016/0170444 A1    Jun. 16, 2016

Related U.S. Application Data

(63) Continuation of application No. 14/166,062, filed on Jan. 28, 2014, now Pat. No. 9,280,181.

(30) Foreign Application Priority Data

Mar. 26, 2013  (JP) .................................. 2013-064122
Aug. 12, 2013  (JP) .................................. 2013-167751

(51) Int. Cl.
G06F 1/16    (2006.01)
H05K 5/00    (2006.01)

(52) U.S. Cl.
CPC ............. *G06F 1/162* (2013.01); *G06F 1/1637* (2013.01); *G06F 1/1643* (2013.01);
(Continued)

(58) Field of Classification Search
None
See application file for complete search history.

(56) References Cited

U.S. PATENT DOCUMENTS 5,541,813 A    7/1996    Satoh et al.
6,430,038 B1   8/2002    Helot et al.
(Continued)

FOREIGN PATENT DOCUMENTS

EP    1 513 047 A2    3/2005
EP    1 975 762 A1    10/2008

OTHER PUBLICATIONS

Extended European Search Report issued Oct. 17, 2014, in Application No. / Patent No. 14152467.8-1959 / 2784624.
(Continued)

*Primary Examiner* — Lisa Lea Edmonds
(74) *Attorney, Agent, or Firm* — Oblon, McClelland, Maier & Neustadt, L.L.P.

(57) ABSTRACT

There is provided an electronic apparatus, including a first housing, a second housing which has a display section and a support member supporting the display section, and a housing connection section which rotatably connects the second housing with respect to the first housing. The support member includes a first support section connected to the housing connection section, a second support section which fixedly supports the display section, and a support connection section, positioned between the first support section and the second support section, which has a flexibility to rotatably connect the second support section with respect to the first support section.

12 Claims, 49 Drawing Sheets

(52) U.S. Cl.
CPC .......... *G06F 1/1662* (2013.01); *G06F 1/1677* (2013.01); *G06F 1/1679* (2013.01); *H05K 5/0017* (2013.01); *G06F 2200/1614* (2013.01)

(56) References Cited

U.S. PATENT DOCUMENTS

| | | |
|---|---|---|
| 6,829,140 B2 | 12/2004 | Shimano et al. |
| 6,903,927 B2 | 6/2005 | Anlauff |
| 6,947,279 B2 | 9/2005 | Cheng et al. |
| 7,215,538 B1 | 5/2007 | Chen et al. |
| 7,403,378 B2 | 7/2008 | Lo et al. |
| 7,652,873 B2 | 1/2010 | Lee |
| 8,077,151 B2 | 12/2011 | Morooka |
| 8,089,760 B2 | 1/2012 | Yi-Chang |
| 8,390,997 B1 | 3/2013 | Dominy et al. |
| 8,654,518 B2 | 2/2014 | Wei |
| 8,654,520 B2 | 2/2014 | Lin et al. |
| 8,665,044 B2 | 3/2014 | Lauder et al. |
| 8,934,232 B2 | 1/2015 | Hsu et al. |
| 8,947,868 B2 * | 2/2015 | Motoishi .............. G06F 1/1613 361/679.21 |
| 8,988,354 B2 | 3/2015 | Milhe et al. |
| 8,988,863 B2 | 3/2015 | Hung et al. |
| 2005/0052834 A1 | 3/2005 | Tanaka et al. |
| 2007/0230120 A1 | 10/2007 | Hata et al. |
| 2008/0238816 A1 | 10/2008 | Matsushita |
| 2008/0271288 A1 | 11/2008 | Senatori |
| 2013/0050924 A1 | 2/2013 | Yang et al. |
| 2013/0241383 A1 | 9/2013 | Hsu et al. |
| 2013/0314859 A1 | 11/2013 | Huang et al. |
| 2013/0329375 A1 | 12/2013 | Chiang et al. |
| 2014/0340829 A1 | 11/2014 | Matsumoto et al. |

OTHER PUBLICATIONS

Extended European Search Report issued Oct. 20, 2014, in Application No. / Patent No. 14152498.3-1959 / 2784625.

* cited by examiner

ELECTRONIC APPARATUS

CROSS REFERENCE TO RELATED APPLICATIONS

This application is a continuation of U.S. application Ser. No. 14/166,062, filed Jan. 28, 2014, currently pending, which claims the benefit of Japanese Priority Patent Application JP 2013-064122 filed Mar. 26, 2013, and Japanese Priority Patent Application JP 2013-167751 filed Aug. 12, 2013. The entire contents of each of the above-noted applications are incorporated herein by reference.

BACKGROUND

The present disclosure relates to an electronic apparatus, and in more detail, relates to an electronic apparatus constituted so that a display side housing having a display section is capable of rotating with respect to a main body side housing via connection sections.

Foldable notebook personal computers have become prevalent as electronic apparatuses. In such electronic apparatuses, connection sections which are hinges rotatably connect a second housing having a display section with respect to a first housing having an operation section.

JP 2011-48536A discloses an electronic apparatus in which a display section is rotated to be capable of opening and closing with respect to a main body section via connection sections. Further, the display section of JP 2011-48536A has a touch panel. Also, when the display section is open, a user operates operation keys included on the main body section while viewing the display section, and when the display section is closed, the user performs touch operations while viewing the display section (a so-called tablet).

SUMMARY

Incidentally, the utilization modes of electronic apparatuses are diverse, and implementation of a configuration in which a display section is allowed to be positioned in a plurality of rotation states with respect to a main body section has been in demand. In order to implement such a demand, measures have been considered in which a plurality of connection sections are included.

However, as shown in the above described JP 2011-48536A, connection sections have a complex configuration with various parts built in, and the thickness of the connection sections can easily increase. Therefore, when a plurality of connection sections are included, the thickness of the entire electronic apparatus can easily increase.

Accordingly, the present disclosure proposes an electronic apparatus which can suppress an increase in the thickness of the apparatus while allowing a second housing having a display section to rotate in a plurality of rotation states with respect to a first housing via a plurality of connection sections.

According to the present disclosure, there is provided an electronic apparatus, including a first housing, a second housing which has a display section and a support member supporting the display section, and a housing connection section which rotatably connects the second housing with respect to the first housing. The support member includes a first support section connected to the housing connection section, a second support section which fixedly supports the display section, and a support connection section, positioned between the first support section and the second support section, which has a flexibility to rotatably connect the second support section with respect to the first support section.

According to the present disclose such as described above, it becomes possible to suppress an increase in the thickness of the apparatus while allowing a second housing having a display section to rotate in a plurality of rotation states with respect to a first housing via a plurality of connection sections.

Note that, the above described effect is not necessarily limited, and any of the effects to be shown in the present disclosure, or other effects which can be understood from the present disclosure, may be accomplished along with the above described effect or instead of the above described effect.

DETAILED DESCRIPTION OF THE EMBODIMENT(S)

Figure 1:
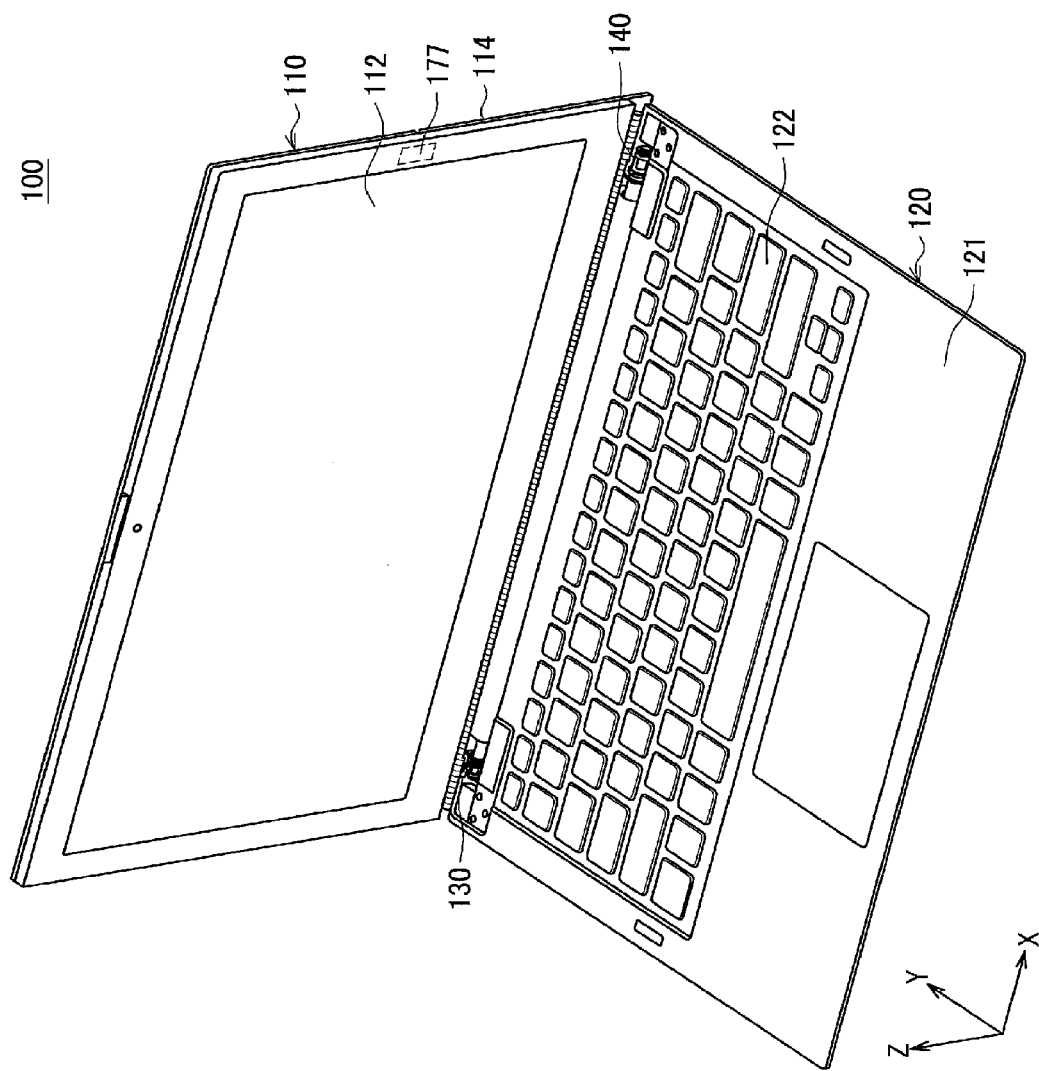
FIG. 1 is a perspective view which shows an opened state of an electronic apparatus 100 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. The first embodiment
  1-1. Schematic configuration of the electronic apparatus
  1-2. Connection bending section and peripheral configuration
  1-3. Detailed configuration of the hinge mechanism sections
  1-4. Rotation operation of the electronic apparatus between the closed state and the reversed state
  1-5. Conclusion
2. The second embodiment
3. The third embodiment
4. The fourth embodiment
5. The fifth embodiment
6. The sixth embodiment

1. The First Embodiment

1-1. Configuration of the Electronic Apparatus

Figure 2:
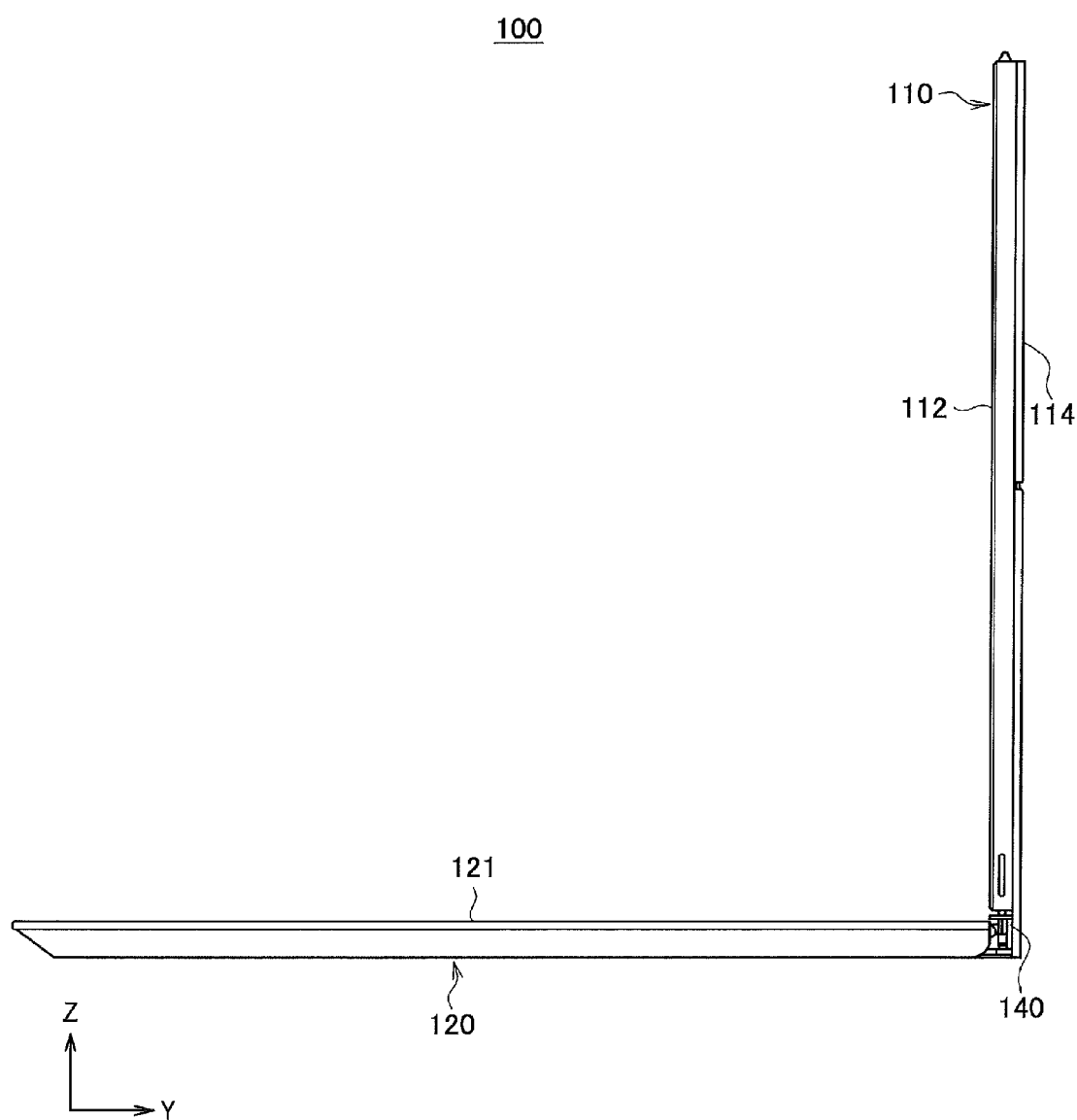
FIG. 2 is a side view of the electronic apparatus 100 shown in FIG. 1.
Figure 3:
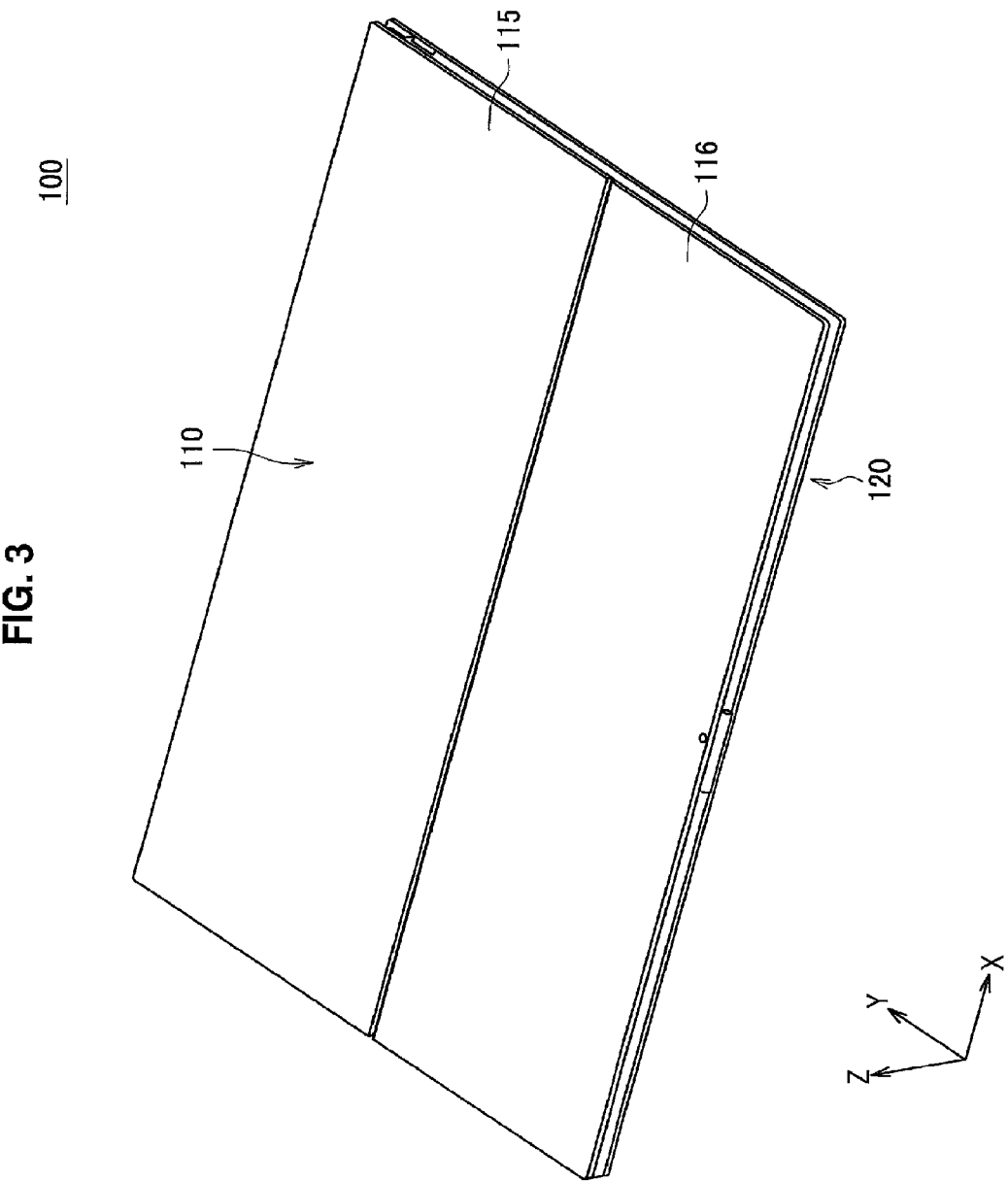
FIG. 3 is a perspective view which shows the electronic apparatus 100 in a closed state.
Figure 4:
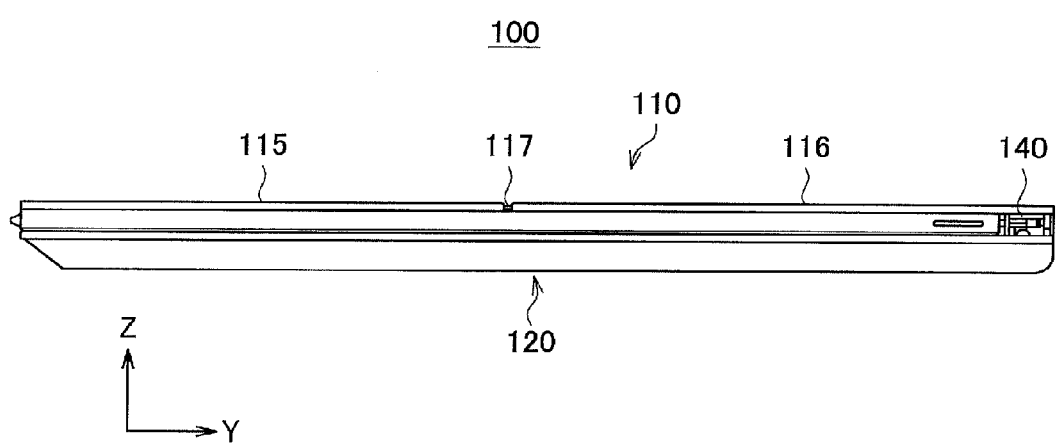
FIG. 4 is a side view of the electronic apparatus 100 shown in FIG. 3.
Figure 5:
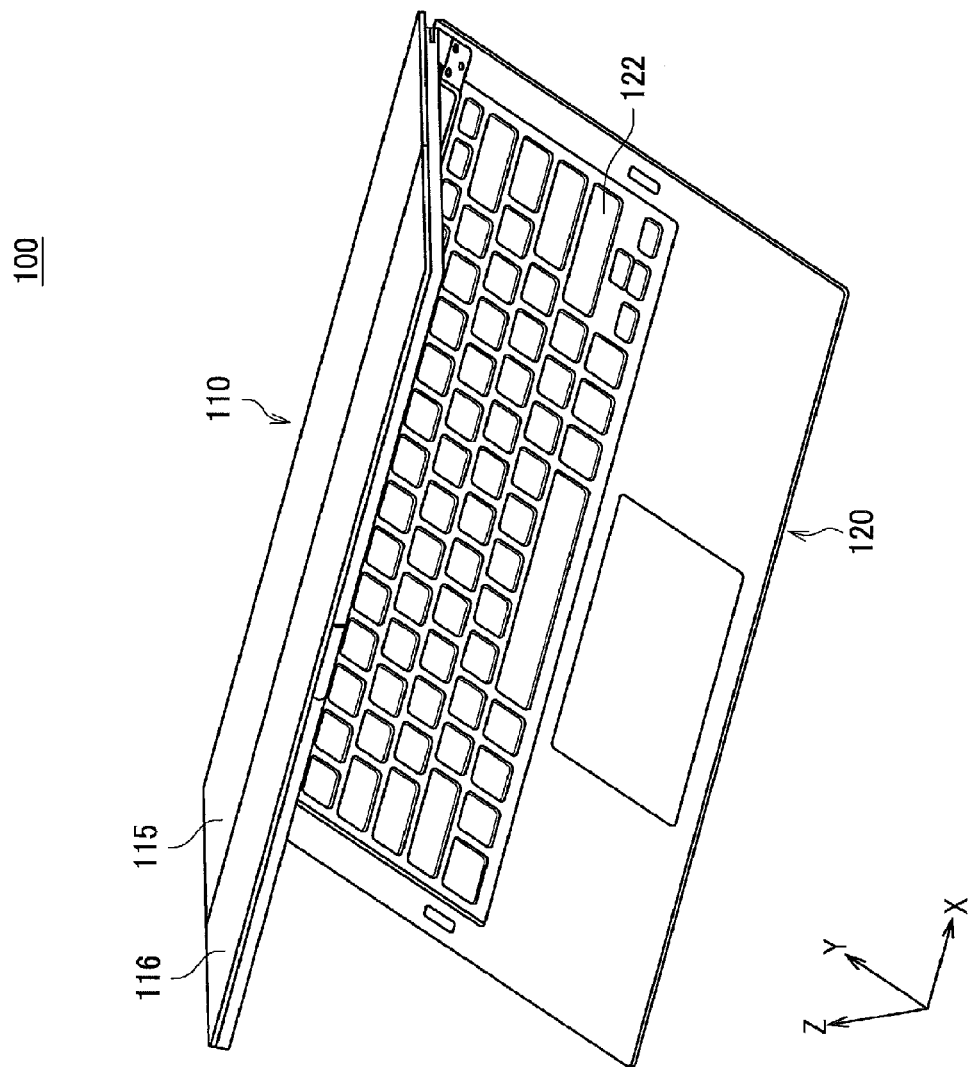
FIG. 5 is a perspective view which shows the electronic apparatus 100 when a display side housing 110 is rotated by hinge mechanism sections 130 and 140.
Figure 6:
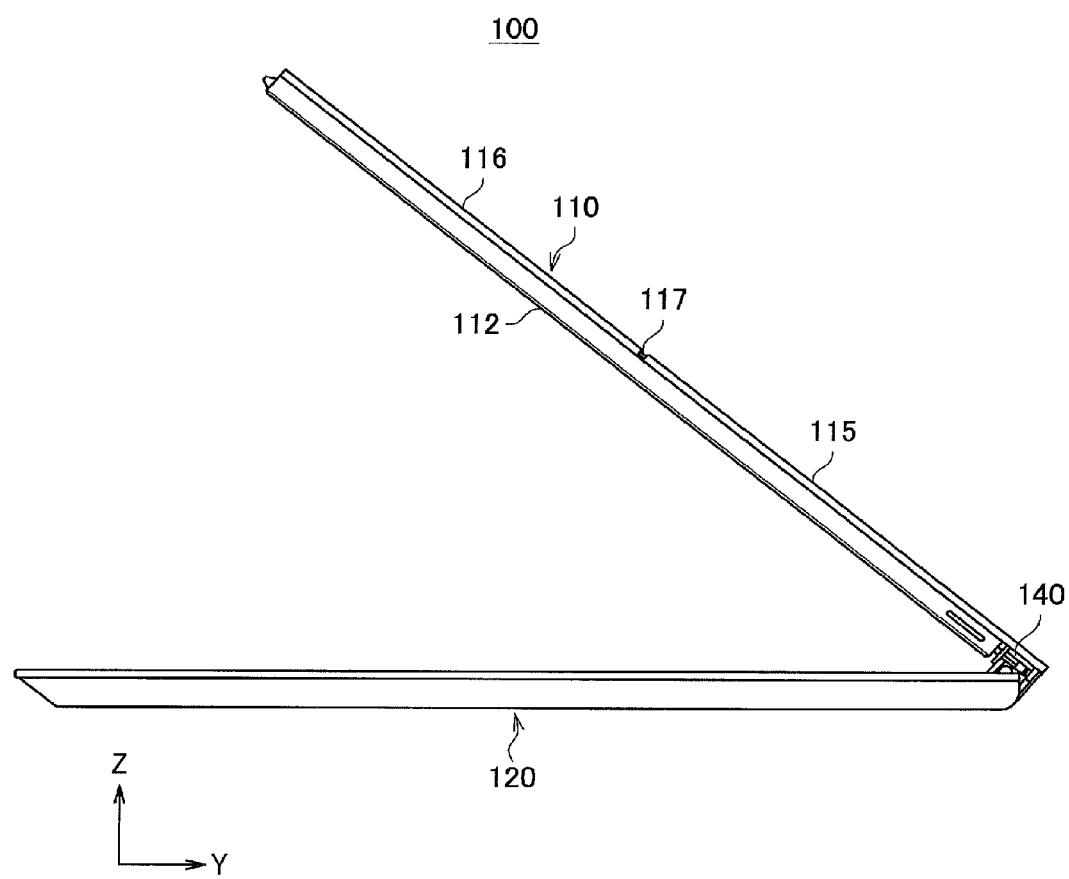
FIG. 6 is a side view of the electronic apparatus 100 shown in FIG. 5.
Figure 7:
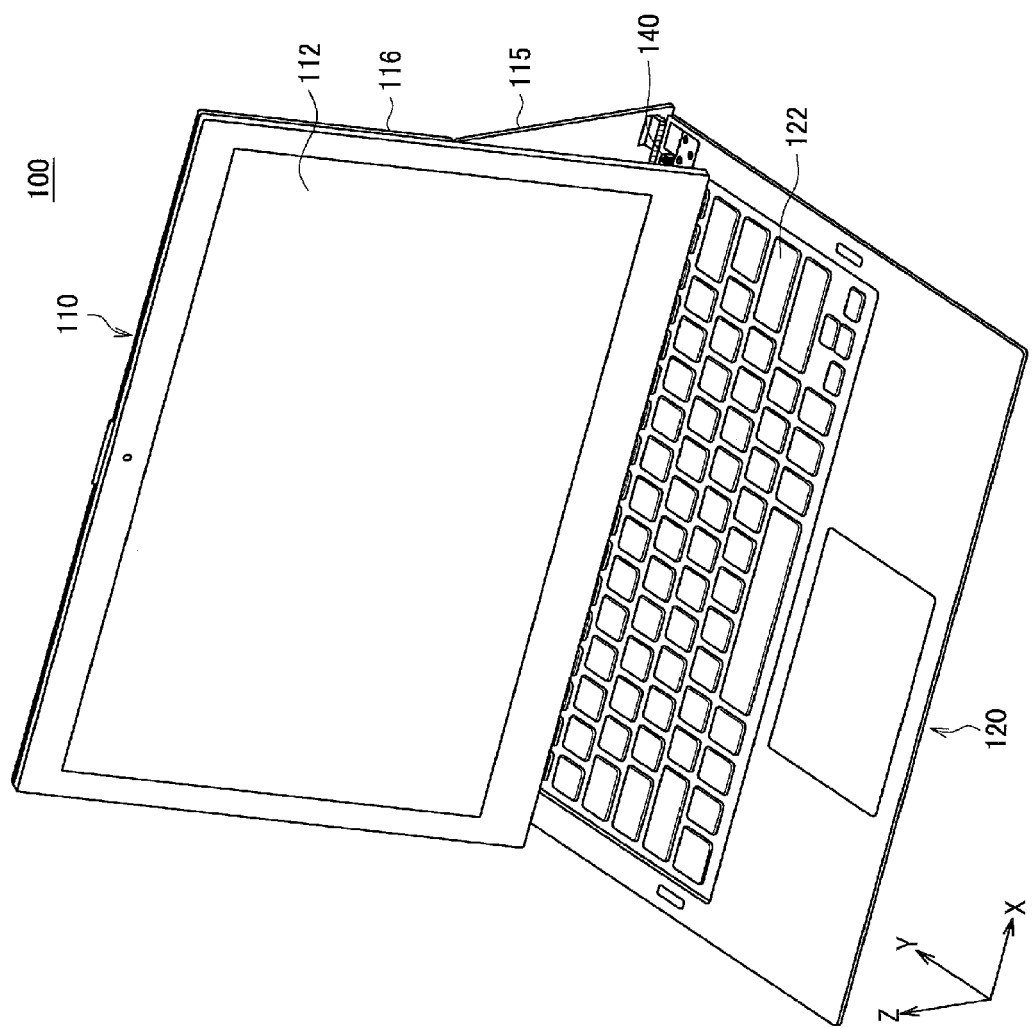
FIG. 7 is a perspective view which shows the electronic apparatus 100 when the display side housing 110 is rotated by a connection bending section 117.
Figure 8:
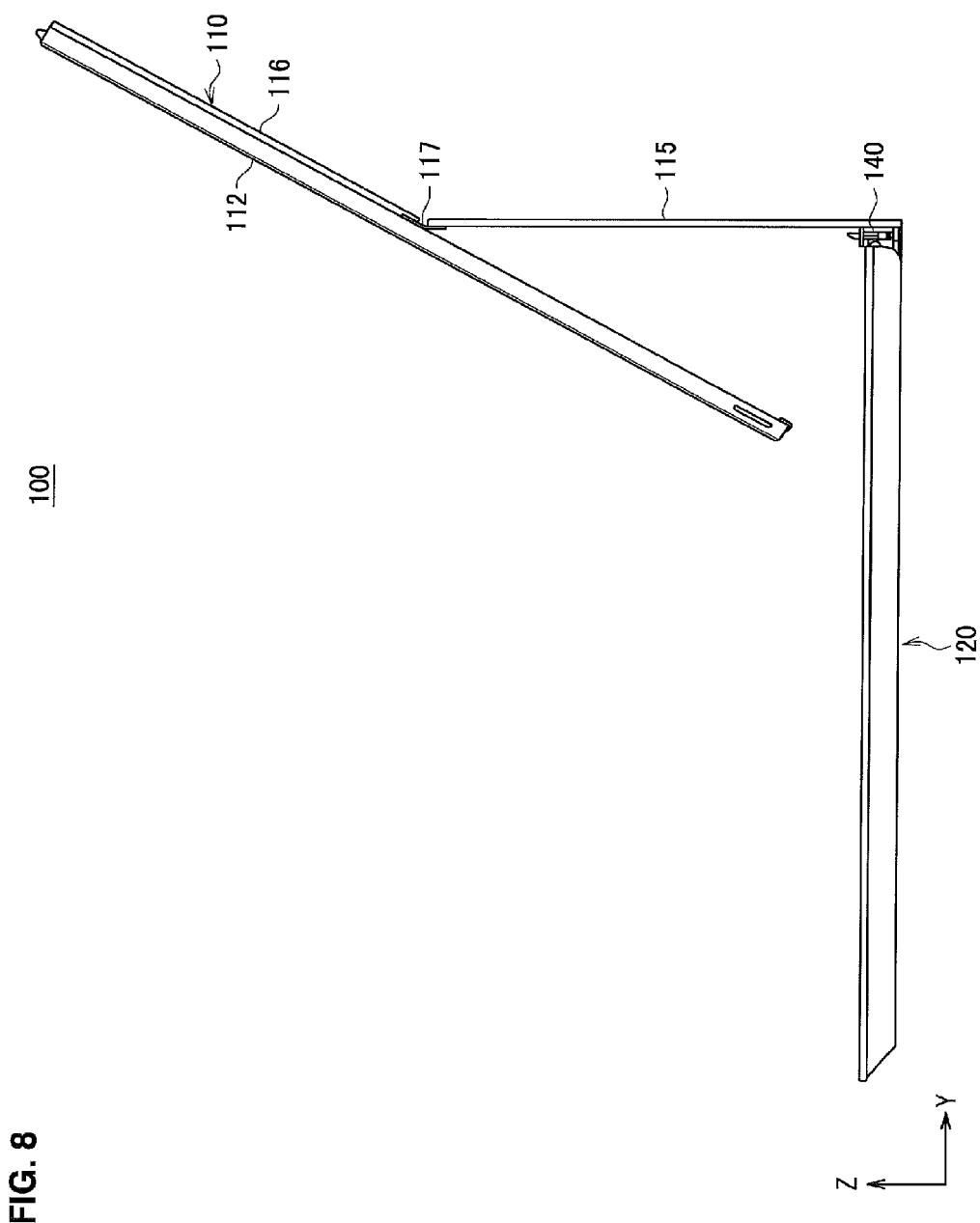
FIG. 8 is a side view of the electronic apparatus 100 shown in FIG. 7.
Figure 9:
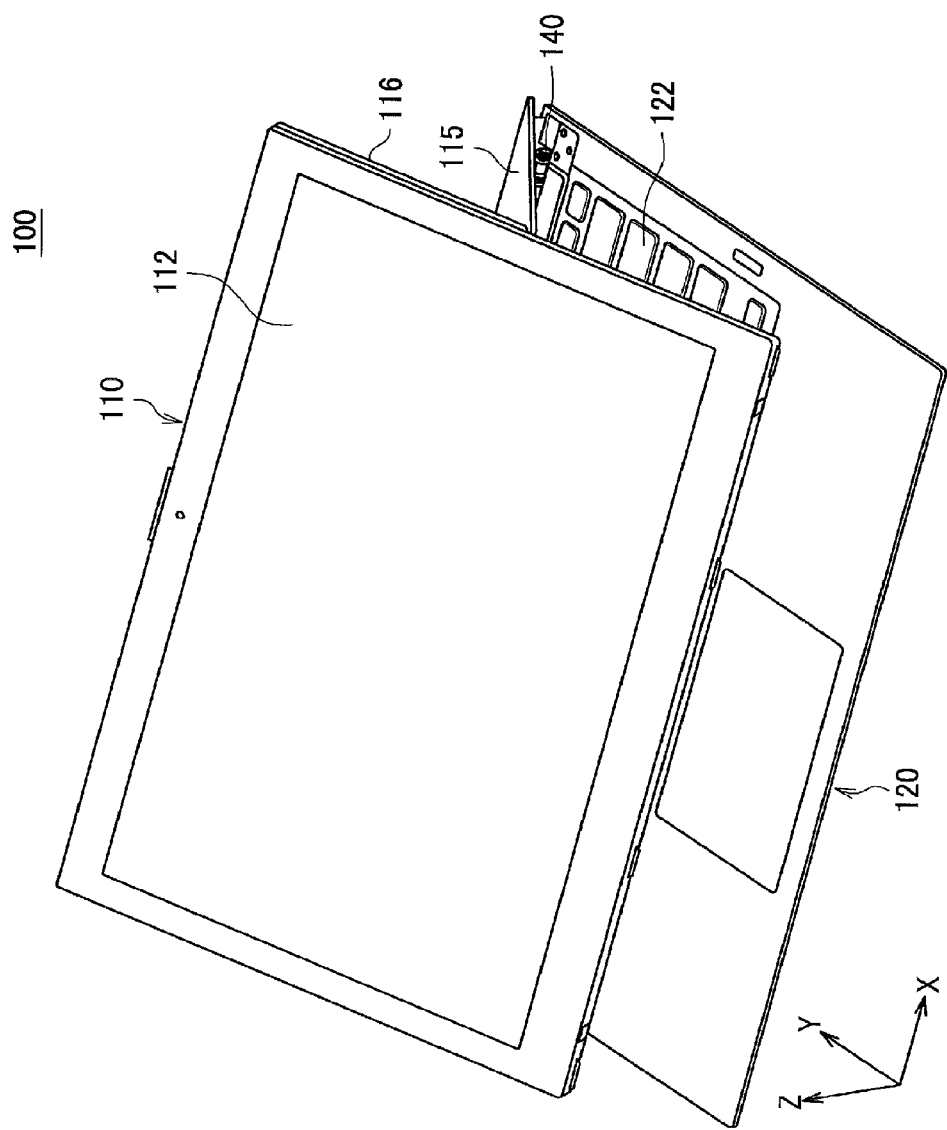
FIG. 9 is a perspective view which shows the electronic apparatus 100 when the display side housing 110 is rotated by the connection bending section 117.
Figure 10:
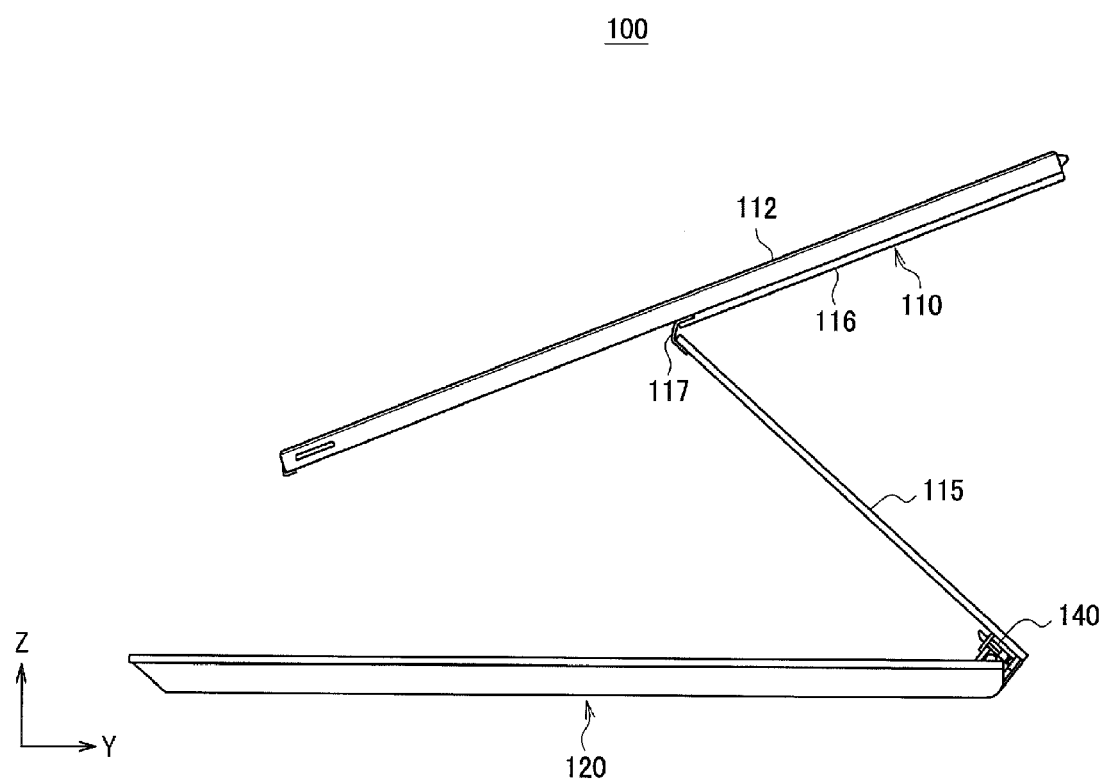
FIG. 10 is a side view of the electronic apparatus 100 shown in FIG. 9.

An example of the configuration of an electronic apparatus 100 according to an embodiment of the present disclosure will be described with reference to FIG. 1 to FIG. 14. FIG. 1 is a perspective view which shows an opened state of the electronic apparatus 100 according to an embodiment of the present disclosure. FIG. 2 is a side view of the electronic apparatus 100 shown in FIG. 1. FIG. 3 is a perspective view which shows the electronic apparatus 100 in a closed state. FIG. 4 is a side view of the electronic apparatus 100 shown in FIG. 3. FIG. 5 is a perspective view which shows the electronic apparatus 100 when a display side housing 110 is rotated by hinge mechanism sections 130 and 140. FIG. 6 is a side view of the electronic apparatus 100 shown in FIG. 5. FIG. 7 is a perspective view which shows the electronic apparatus 100 when the display side housing 110 is rotated by a connection bending section 117. FIG. 8 is a side view of the electronic apparatus 100 shown in FIG. 7. FIG. 9 is a perspective view which shows the electronic apparatus 100 when the display side housing 110 is rotated by the connection bending section 117. FIG. 10 is a side view of the electronic apparatus 100 shown in FIG. 9. FIG.

Figure 12:
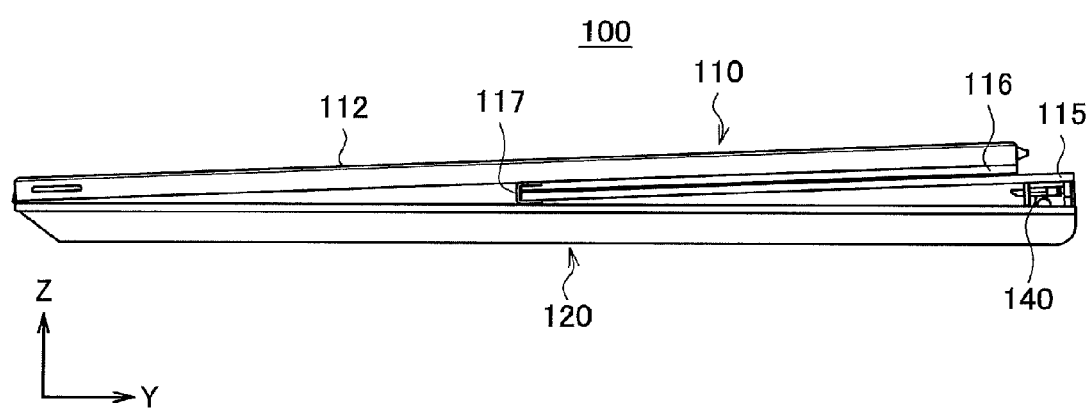
FIG. 12 is a side view of the electronic apparatus 100 shown in FIG. 11.
Figure 13:
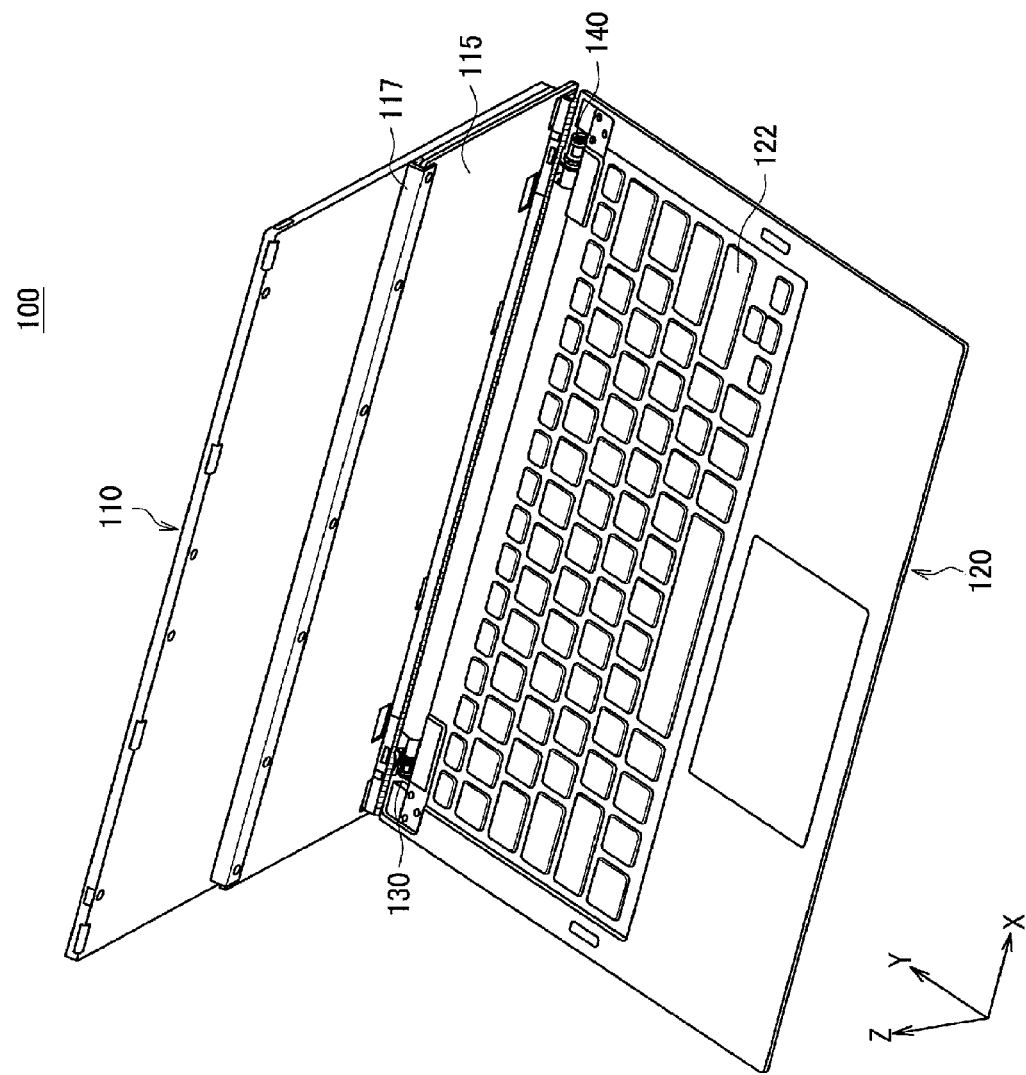
FIG. 13 is a perspective view which shows the electronic apparatus 100 when the display side housing 110 in the reversed state is rotated by the hinge mechanism section 130.
Figure 14:
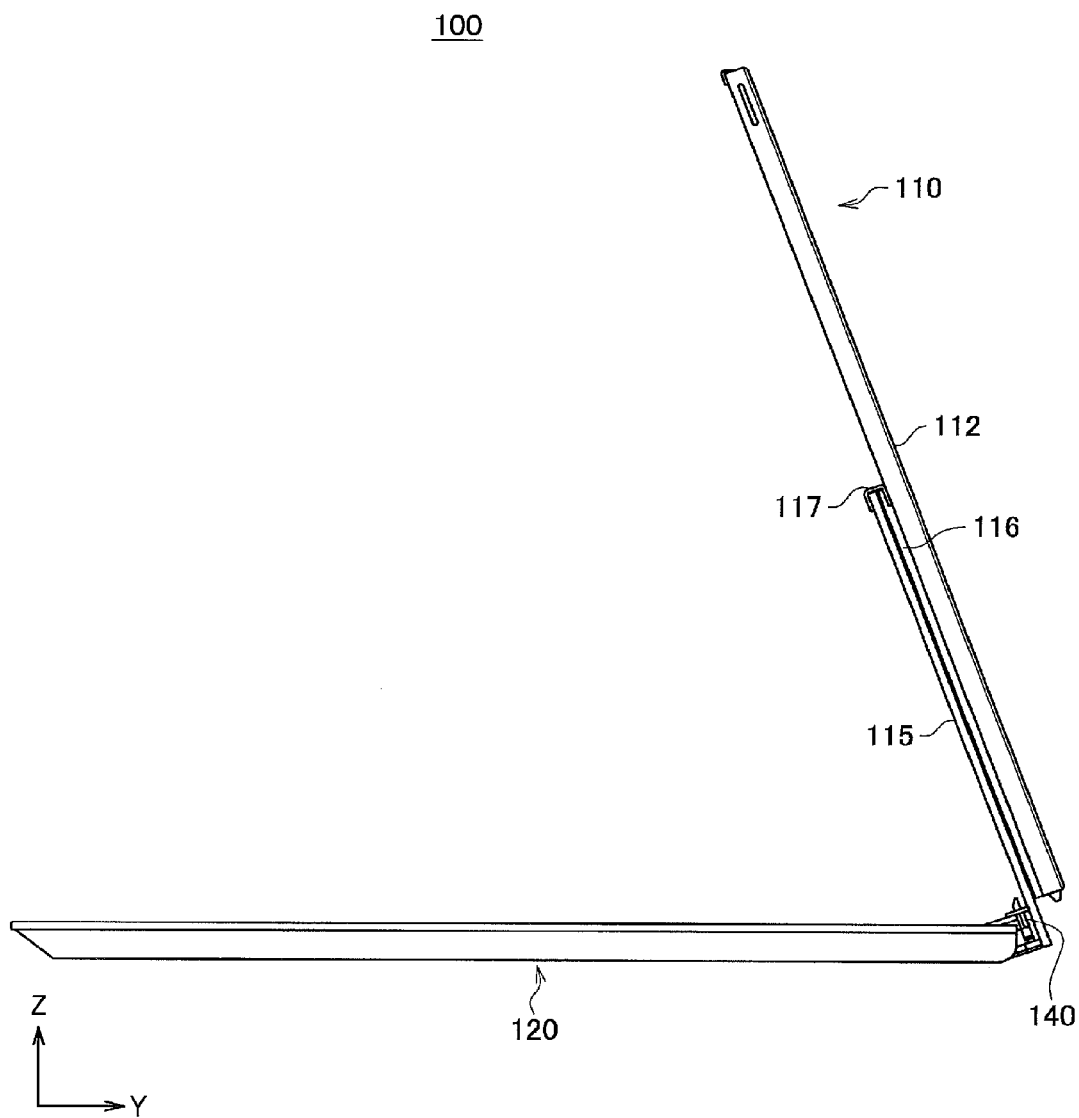
FIG. 14 is a side view of the electronic apparatus 100 shown in FIG. 13.

11 is a perspective view which shows the electronic apparatus 100 in a reversed state. FIG. 12 is a side view of the electronic apparatus 100 shown in FIG. 11. FIG. 13 is a perspective view which shows the electronic apparatus 100 when the display side housing 110 in the reversed state is rotated by the hinge mechanism sections 130 and 140. FIG. 14 is a side view of the electronic apparatus 100 shown in FIG. 13.

The electronic apparatus 100 is, for example, a notebook personal computer. As shown in FIG. 1, the electronic apparatus 100 has a display side housing 110, a main body side housing 120, and hinge mechanism sections 130 and 140 which rotatably connect the display side housing 110 and the main body side housing 120. The display side housing 110 and the main body side housing 120 are each flat plate shaped, for example, and are formed with the same size. Note that, in the present embodiment, the main body side housing 120 corresponds to a first housing, the display side housing 110 corresponds to a second housing, and the hinge mechanism sections 130 and 140 correspond to housing connection sections.

The display side housing 110 has a display section 112. The display section 112 is constituted, for example, by a display device such as a liquid crystal display. The display section 112 has a display screen which displays various types of information. Note that, a touch panel capable of being operated by a user's touch is superimposed on the display section 112. In this way, it is possible for a user to perform touch operations when the display side housing 110 is in a reversed state (FIG. 13). That is, it is possible for the electronic apparatus 100 to be used as a so-called tablet.

The main body side housing 120 has an input section 122 which accepts input operations of a user. The input section 122 includes a keyboard, a touch pad or the like such as shown in FIG. 1. The input section 122 detects input operations of the user, and outputs electrical signals corresponding to the input operations. The user performs input operations with the input section 122 when the display side housing 110 is in an opened state (FIG. 1).

The hinge mechanism sections 130 and 140 rotatably connect the display side housing 110 (specifically, a support plate 114) with respect to the main body side housing 120. The hinge mechanism sections 130 and 140 are included on both sides of the long direction (the X direction shown in FIG. 1) of the main body side housing 120. The display side housing 110 rotates, by the hinge mechanism sections 130 and 140, between an opened state (FIG. 1) in which the display side housing 110 is opened with respect to the main body side housing 120, and a closed state (FIG. 3) in which the display side housing 110 is closed with respect to the main body side housing 120. For example, the display side housing 110, which is positioned in the opened state shown in FIG. 1 (FIG. 2), is positioned in the closed state shown in FIG. 3 (FIG. 4), via a rotation state shown in FIG. 5 (FIG. 6) by rotating. Note that, a detailed description of the hinge mechanism sections 130 and 140 will be described later.

Incidentally, the display side housing 110 has a support plate 114, which is an example of a support member which supports the display section 112 on the rear surface side of the display section 112. The size of the support plate 114 is approximately the same as the size of the display section 112. The support plate 114 of the present embodiment has a first support section 115 and a second support section 116, divided into two by sandwiching a small space in the Y direction shown in FIG. 3. The first support section 115 and the second support section 116 are support plates each having approximately the same size.

As shown in FIG. 7, the first support section 115 is connected to the hinge mechanism section 130. The second support section 116 fixedly supports the display section 112 on the rear surface side of the display section 112. The thickness of the first support section 115 is the same size as the thickness of the second support section 116. In this way, when the display side housing 110 is in a closed state, such as shown in FIG. 3, the first support section 115 and the second support section 116 will constitute a flat top plate.

As shown in FIG. 8, a connection bending section 117, which is a support connection section having a flexibility to rotatably connect the second support section 116 with respect to the first support section 115, is included between the first support section 115 and the second support section 116. The connection bending section 117 is constituted to be easily bent, by having additional flexibility. Also, by having the connection bending section 117 bend, the second support section 116, to which the display section 112 is fixedly supported, will rotate with respect to the first support section 115. That is, in the present embodiment, the rotation form of the display section 112 is changed by the hinge mechanism sections 130 and 140, and the connection bending section 117.

Figure 11:
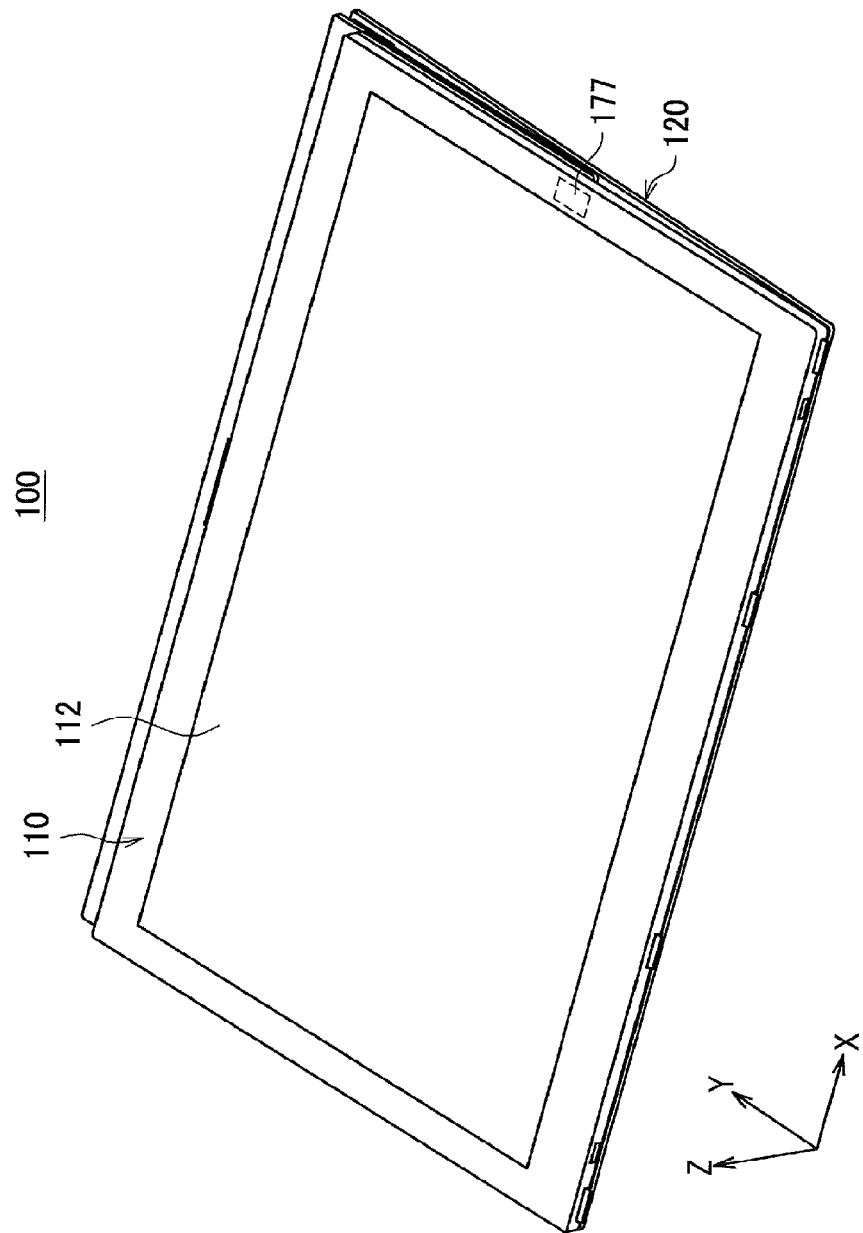
FIG. 11 is a perspective view which shows the electronic apparatus 100 in a reversed state.

For example, by having the second support section 116 rotate with respect to the first support section 115 by the connection bending section 117, the display side housing 110 in the opened state shown in FIG. 1 is positioned in the reversed state shown in FIG. 11 (FIG. 12) in which the display section 112 is reversed, via the rotation states shown in FIG. 7 (FIG. 8) and FIG. 9 (FIG. 10). Since the display section 112 is inclined with respect to the main body side housing 120 in the reversed state, such as shown in FIG. 12, it becomes easy for a user to view information displayed on the display section 112. Note that, a detailed configuration of the connection bending section 117 will be described later.

In addition, in the electronic apparatus 100, the display side housing 110 can be allowed to rotate, in a state in which the display section 112 is positioned in the reversed state, such as shown in FIG. 13 (FIG. 14). In this way, the user can show the display section 112 to a person facing the user.

Incidentally, a plurality of magnets are built into the electronic apparatus 100, in order to retain a state of the rotating display side housing 110. Hereinafter, state retention of the display side housing 110 by the magnetic force of magnets will be described with reference to FIG. 15.

Figure 15:
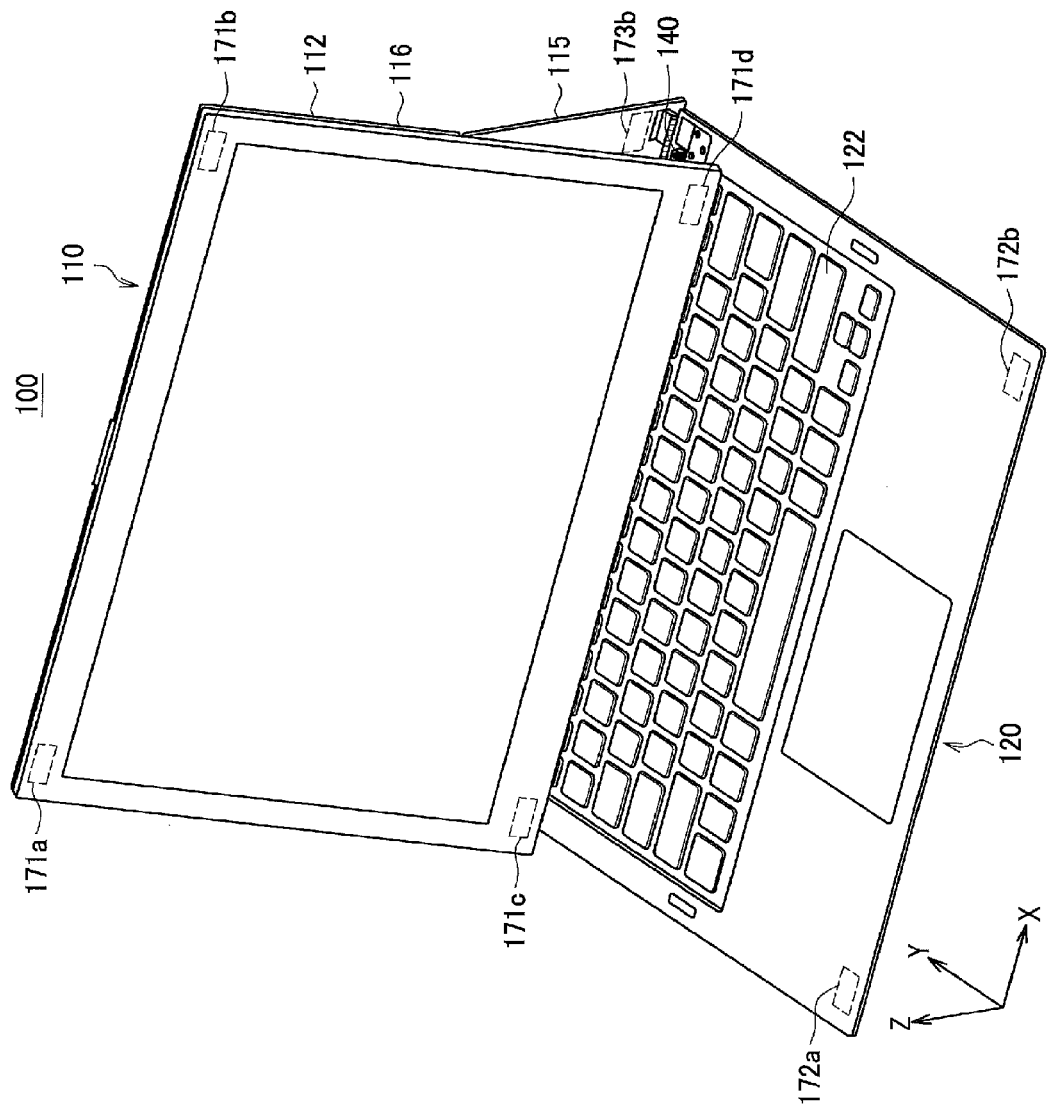
FIG. 15 is a figure for describing the positions of magnets built into the electronic apparatus 100.

FIG. 15 is a figure for describing the positions of magnets built into the electronic apparatus 100. The display side housing 110 has magnets 171a, 171b, 171c and 171d built into the four corners of the housing. The main body side housing 120 has magnets 172a and 172b built into positions corresponding to the magnets 171a and 171b when the display side housing 110 is in the closed state (FIG. 1). The first support section 115 of the support plate 114 has magnets 173a and 173b (refer to FIG. 22) built into both corners of the hinge mechanism section 130 side.

Also, when the display side housing 110 is positioned in the closed state, an attractive force acts between the magnet 171a (171b) and the magnet 172a (172b), and an attractive force acts between the magnet 171c (171d) and the magnet 173a (173b), and the closed state of the display side housing 110 becomes easy to retain. Further, when the display side housing 110 is positioned in the reversed state, an attractive force acts between the magnet 171a (171b) and the magnet 172a (172b), and an attractive force acts between the magnet 171c (171d) and the magnet 173a (173b), and the reversed state of the display side housing 110 becomes easy to retain. Further, the display section 112 is retained on the first support section 115, by having an attractive force act between the magnet 171c (171d) and the magnet 173a (173b), in a state in which the connection bending section 117 is not bent (FIG. 6 or the like). In this way, the display side housing 110 rotates in a state in which the first support section 115 retains the display section 112.

Further, a driving substrate which controls the display of the display section 112 is included in the electronic apparatus 100. In the present embodiment, the driving substrate of the display section 112 is included within the display side housing 110 out of the display side housing 110 and the main body side housing 120.

Figure 16:
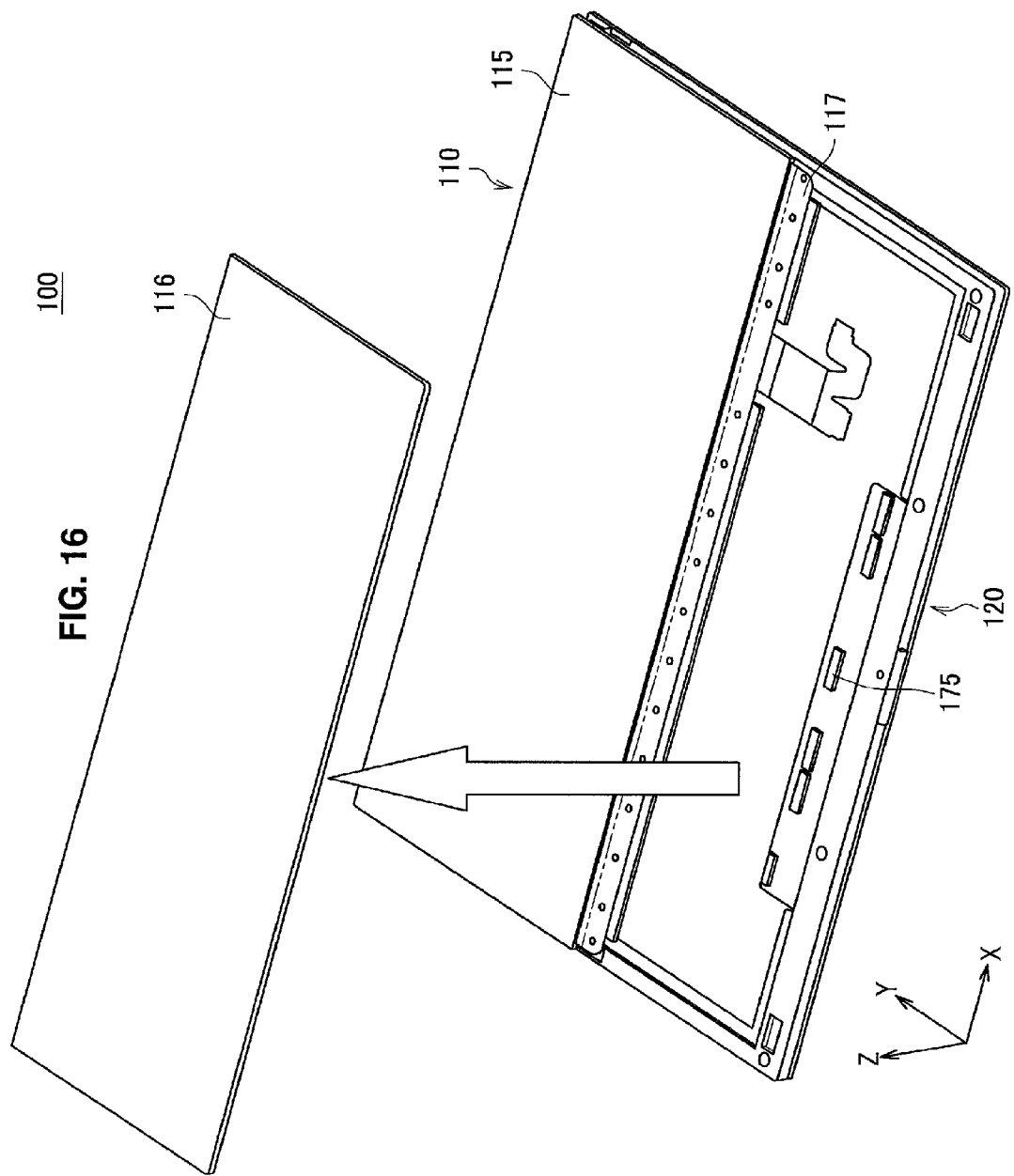
FIG. 16 is a figure for describing the position of a driving substrate 175 of the display section 112.

FIG. 16 is a figure for describing the position of the driving substrate 175 of the display section 112. In FIG. 16, the second support section 116 is detached from the display side housing 110. The driving substrate 175 is included on the rear surface of the display section 112, and is positioned facing the second support section 116. In this way, the first support section 115 and the second support section 116 become the same surface, while an increase in the thickness of the display side housing 110 is suppressed.

Further, the electronic apparatus 100 has an NFC antenna 177 which is a wireless communication section for performing near field wireless communication. The NFC antenna 177 is included on the display section 112 side of the display side housing 110. Specifically, as shown in FIG. 11, the NFC antenna 177 is arranged next to the display section 112 (display screen). By allowing such an arrangement of the NFC antenna 177, since the NFC antenna 177 will face outwards in either the case where the display side housing 110 is in the opened state (FIG. 1) or the reversed state (FIG. 11), wireless communication can be appropriately performed.

1-2. Connection Bending Section 117 and Peripheral Configuration

An example of the connection bending section 117 and a peripheral configuration according to the present embodiment will be described with reference to FIG. 17 to FIG. 20.

Figure 17:
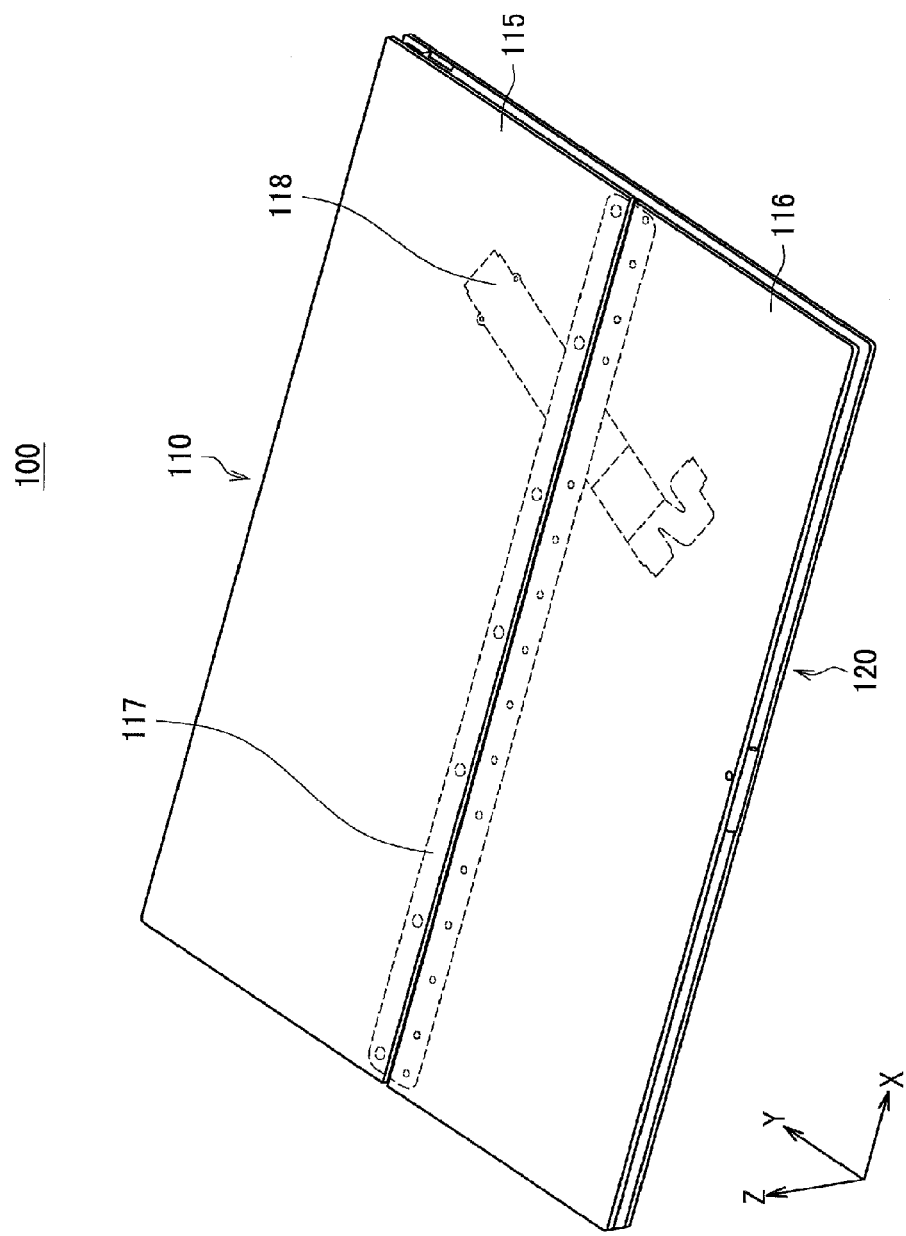
FIG. 17 is a figure for describing the attachment position of the connection bending section 117.
Figure 18:
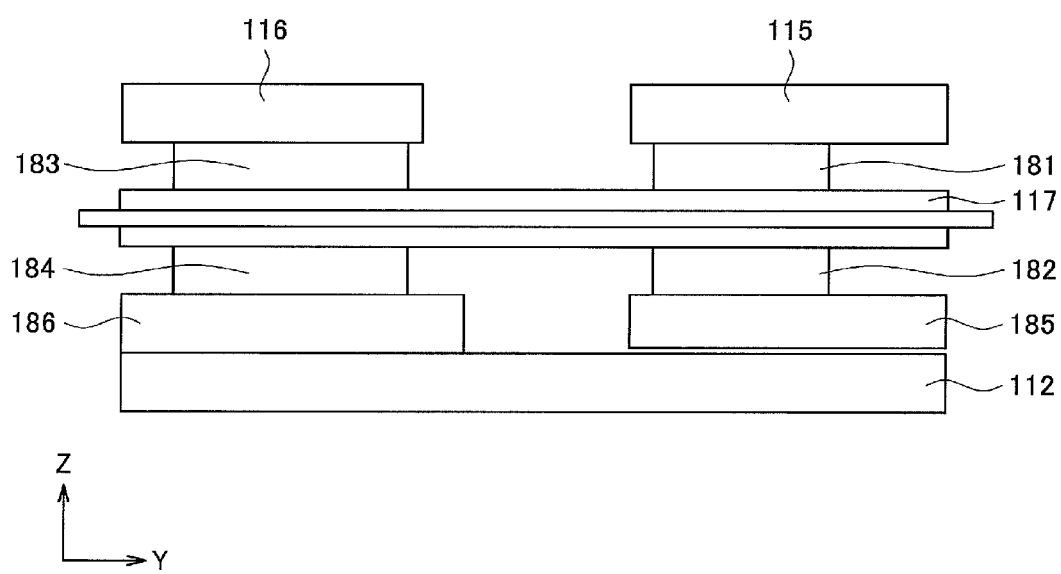
FIG. 18 is a cross-sectional view for describing the attachment structure of the connection bending section 117.
Figure 19:
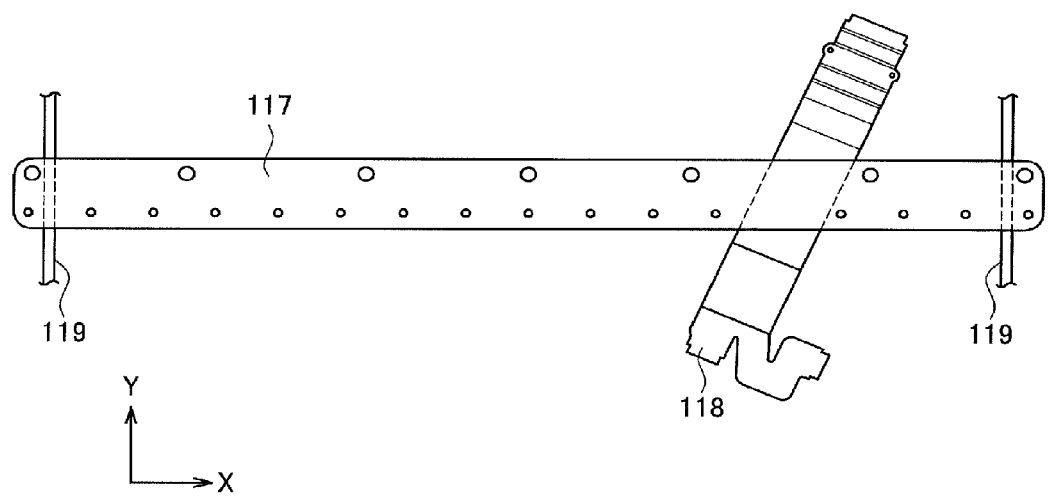
FIG. 19 is a plan view which shows an example of the configuration of the connection bending section 117.
Figure 20:
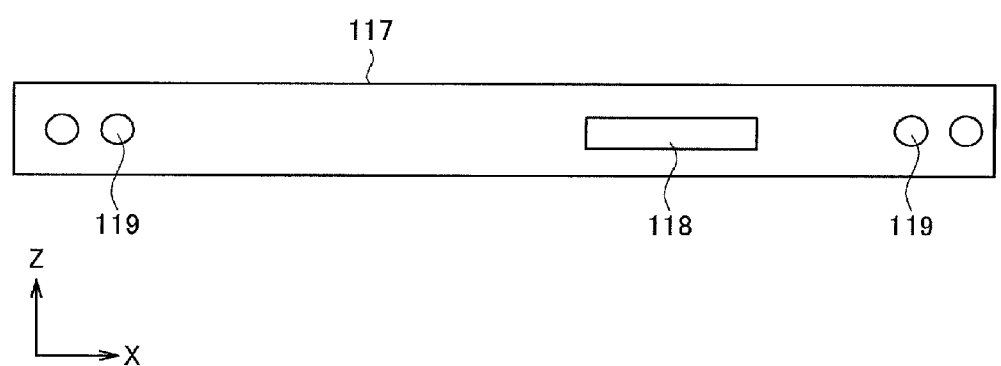
FIG. 20 is a cross-sectional view which shows an example of the configuration of the connection bending section 117.

FIG. 17 is a figure for describing the attachment position of the connection bending section 117. FIG. 18 is a cross-sectional view for describing the attachment structure of the connection bending section 117. FIG. 19 is a plan view which shows an example of the configuration of the connection bending section 117. FIG. 20 is a cross-sectional view which shows an example of the configuration of the connection bending section 117.

The connection bending section 117 rotatably connects the second support section 116, to which the display section 112 is fixedly supported, with respect to the first support section 115 around the long direction (the X direction shown in FIG. 17). The connection bending section 117 is included only for a length equivalent to the width of the display side housing 110, along the long direction (the X direction shown in FIG. 17) at the center side of the display side housing 110.

The connection bending section 117 is, for example, a sheet shaped member which has a prescribed thickness. In this way, since the thickness of the connection bending section 117 can be reduced, an increase in the thickness of the electronic apparatus 100 can be suppressed even if the connection bending section 117 is included. The connection bending section 117 is formed, for example, by a rubber or an elastomer. In this way, the flexibility of the connection bending section 117 can be secured, and the thickness of the connection bending section 117 can be reduced. Note that, the material of the connection bending section 117 is not limited to that described above, and may be a synthetic material, for example.

The connection bending section 117 is sandwiched between the display section 112 and the first support section 115 and second support section 116. Also, one end side of the short direction (the Y direction shown in FIG. 17) of the connection bending section 117 is fixed to the rear surface of the first support section 115 of the support plate 114. Further, the other end side of the short direction of the connection bending section 117 is fixed to the rear surface of the second support section 116.

Specifically, as shown in FIG. 18, one end side of the connection bending section 117 is fixed to the first support section 115 via a tape 181, and is fixed to a frame 185 via a tape 182. Similarly, the other end side of the connection bending section 117 is fixed to the second support section 116 via a tape 183, and is fixed to a frame 186 of the display section 112 via a tape 184.

When the second support section 116 rotates with respect to the first support section 115, the short direction of the connection bending section 117 will bend. In this way, the user can reverse the display section 112 fixedly supporting the second support section 116.

By including the above described connection bending section 117, in the case where the connection bending section 117 is in an unbent state and the display side housing 110 is in a closed state with respect to the main body side housing 120, the display section 112 will face an operation surface 121 (FIG. 1) which is the main surface of the main body side housing 120. On the other hand, in the case where the connection bending section 117 is in a bent state and the display side housing 110 is in a closed state with respect to the main body side housing 120, the support plate 114 will face the operation surface 121 of the main body side housing 120.

Incidentally, as shown in FIG. 19 and FIG. 20, a flexible cable 118, which is a planar wiring cable connected between the main body side housing 120 and the display side housing 110, passes through the inside of the connection bending section 117. The flexible cable 118 connects a substrate included within the main body side housing 120 and a substrate included within the display side housing 110. When the connection bending section 117 bends in accordance with the rotation of the second support section 116, which fixedly supports the display section 112, with respect to the first support section 115, the flexible cable 118 also interlockingly bends.

As shown in FIG. 19, the flexible cable 118 is arranged so as to be inclined with respect to the short direction of the connection bending section 117 inside of the connection bending section 117. By allowing such an arrangement of the flexible cable 118, the flexibility of the flexible cable 118 will be improved when compared to the case of arranging the flexible cable 118 in parallel with the short direction of the connection bending section 117. As a result, breaking of the flexible cable 118 can be suppressed, even if the flexible cable 118 is repeatedly bent in accordance with the bending of the connection bending section 117.

Further, as shown in FIG. 19 and FIG. 20, wires 119 are embedded inside of both end sides of the long direction of the connection bending section 117. The wires 119 are included so as to be orthogonal with respect to the connection bending section 117. By including such wires 119, expansion due to repeating the bending of the connection bending section 117 can be suppressed.

Note that, while a description has been made in which the flexible cable 118 is arranged so as to be inclined with respect to the short distance of the connection bending section 117, the present disclosure is not limited to this. For example, the flexible cable 118 may be arranged so as to be parallel with the short direction of the connection bending section 117. In such a case, it is preferable to use a material for the flexible cable 118 which has a high rigidity.

Further, while the above described wires 119 are embedded inside of the connection bending section 117, the present disclosure is not limited to this, and the wires 119 may not be embedded in the connection bending section 117.

1-3. Detailed Configuration of the Hinge Mechanism Sections 130 and 140

As described above, hinge mechanism sections 130 and 140, which allow the display side housing 110 to rotate, are included on both sides of the long direction (the X direction shown in FIG. 1) of the main body side housing 120. Hereinafter, a detailed configuration of the hinge mechanisms sections 130 and 140 will be described with reference to FIG. 21 to FIG. 28.

Figure 21:
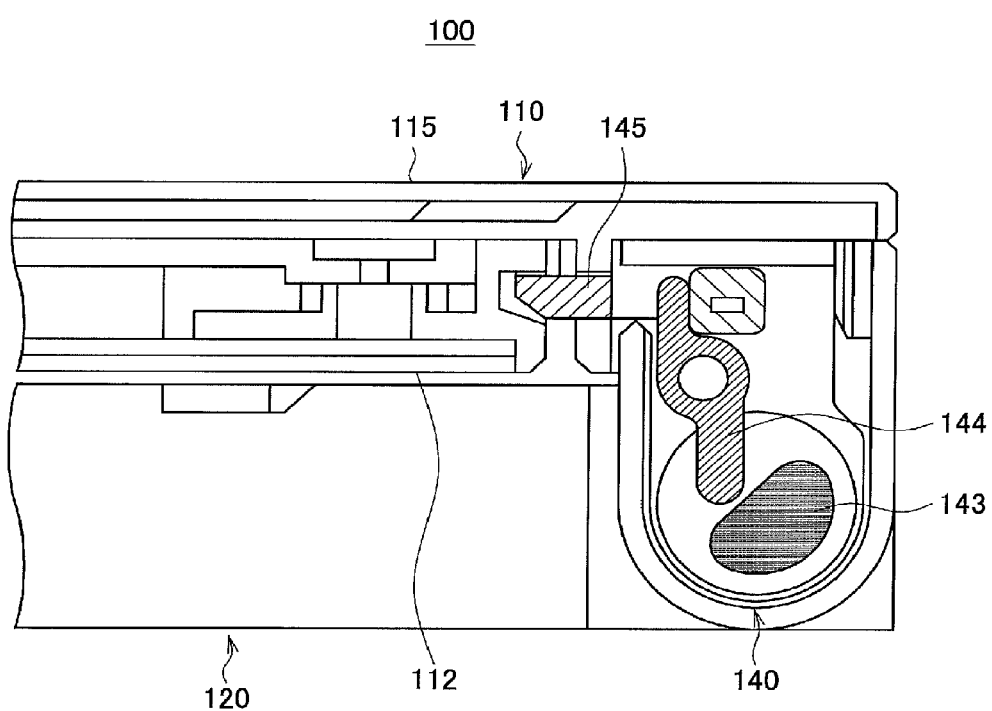
FIG. 21 is a cross-sectional view which shows a state of the hinge mechanism sections when the display side housing 110 is in the closed state.
Figure 22:
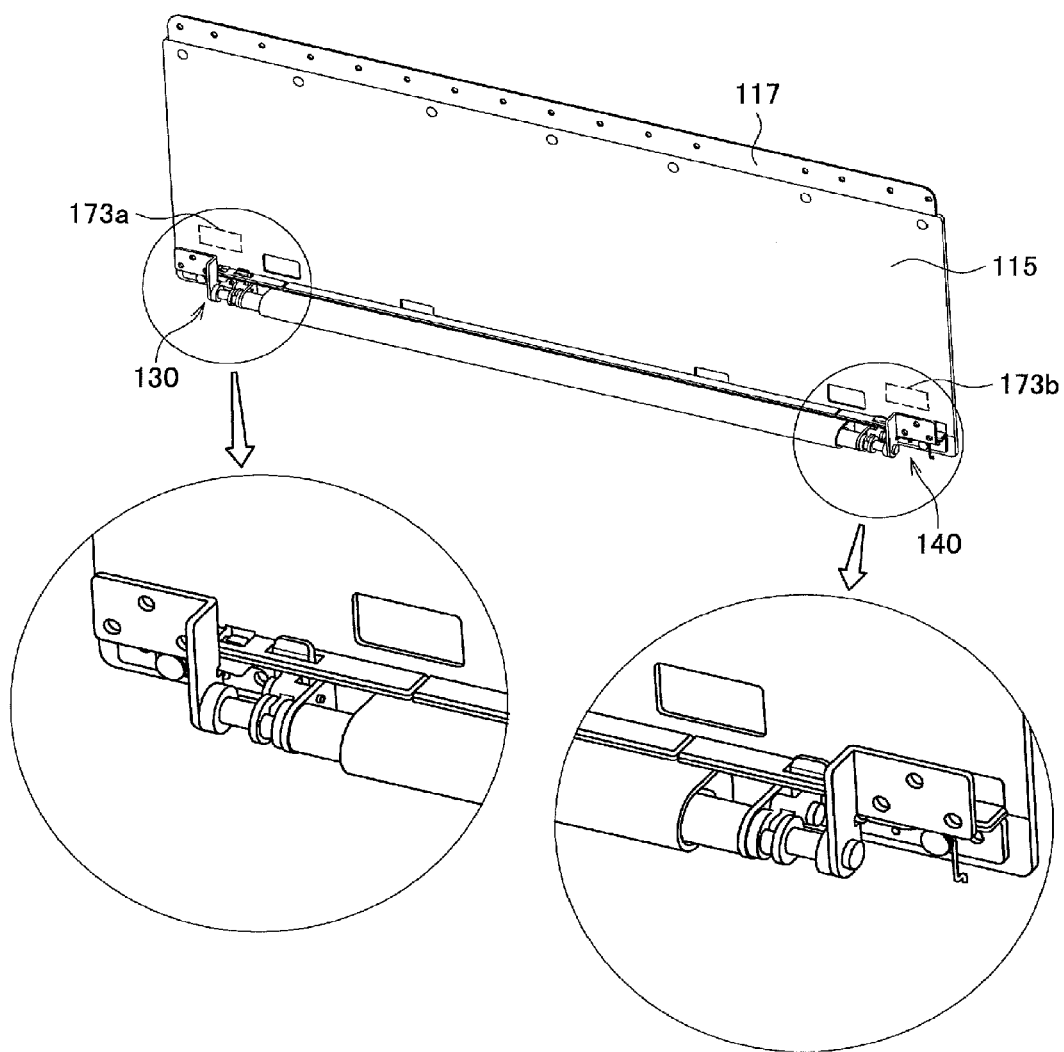
FIG. 22 is a perspective view which shows a state of the hinge mechanism sections when the display side housing 110 is in the closed state.
Figure 23:
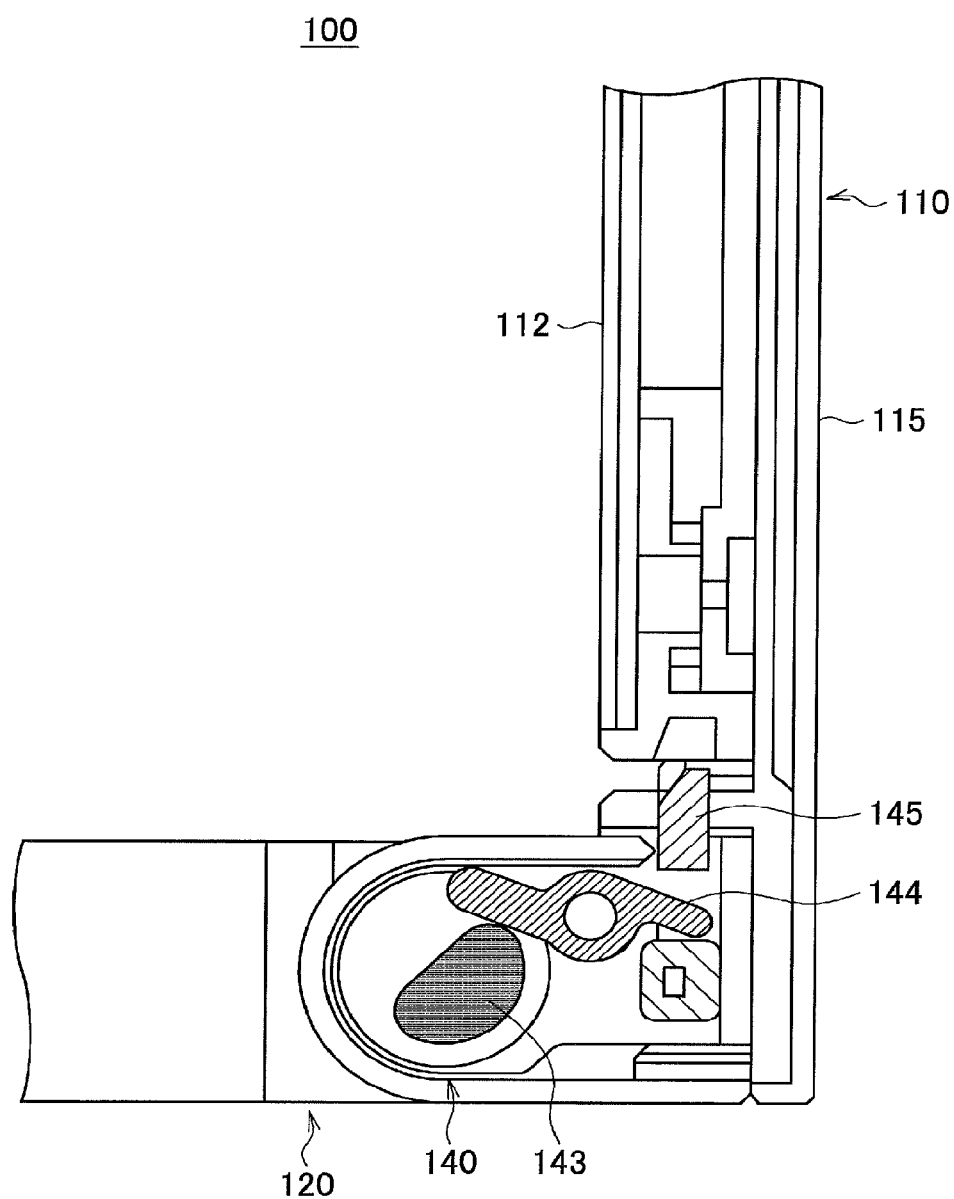
FIG. 23 is a cross-sectional view which shows a state of the hinge mechanism sections when the display side housing 110 is in the opened state.
Figure 24:
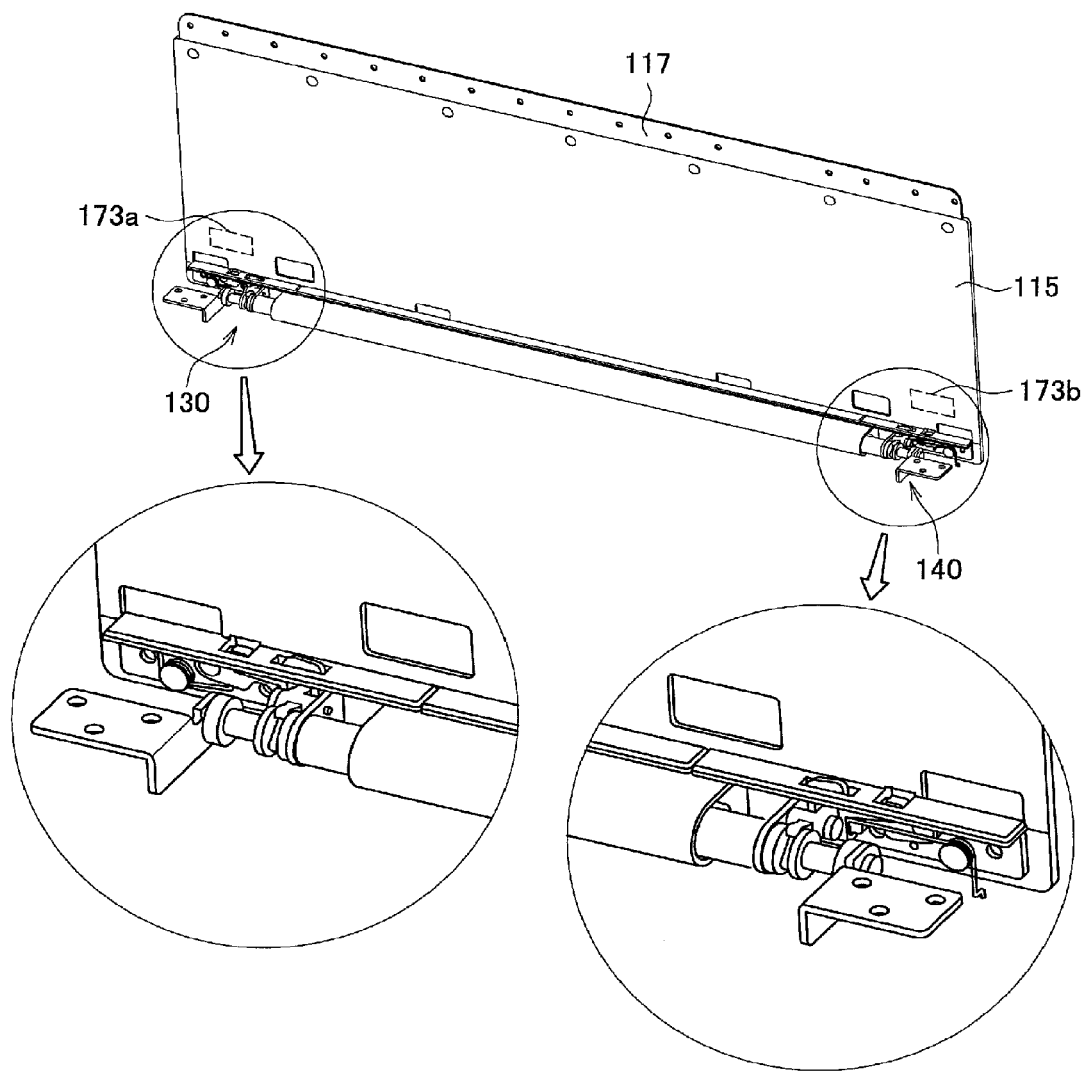
FIG. 24 is a perspective view which shows a state of the hinge mechanism sections when the display side housing 110 is in the opened state.
Figure 25:
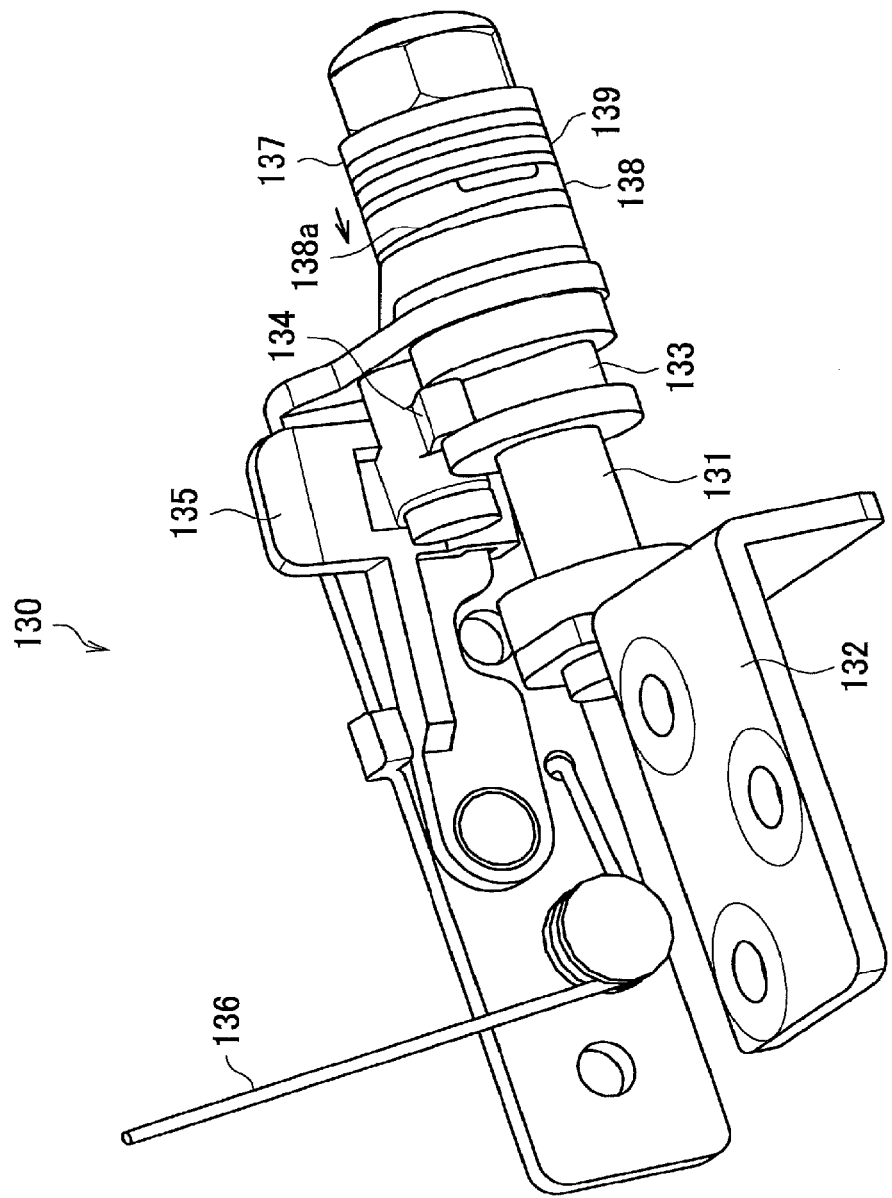
FIG. 25 is a perspective view which shows a detailed configuration of the hinge mechanism section 130.
Figure 26:
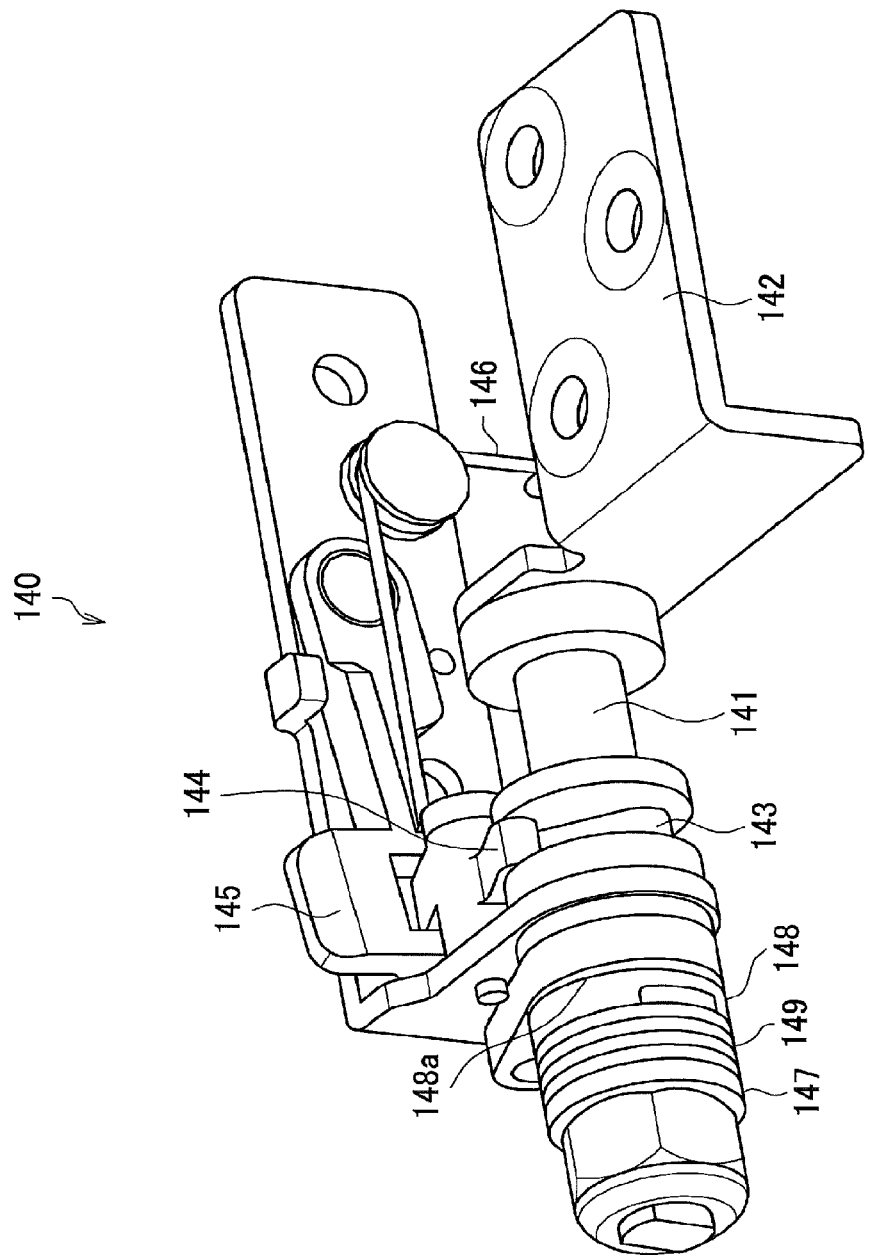
FIG. 26 is a perspective view which shows a detailed configuration of the hinge mechanism section 140.
Figure 27:
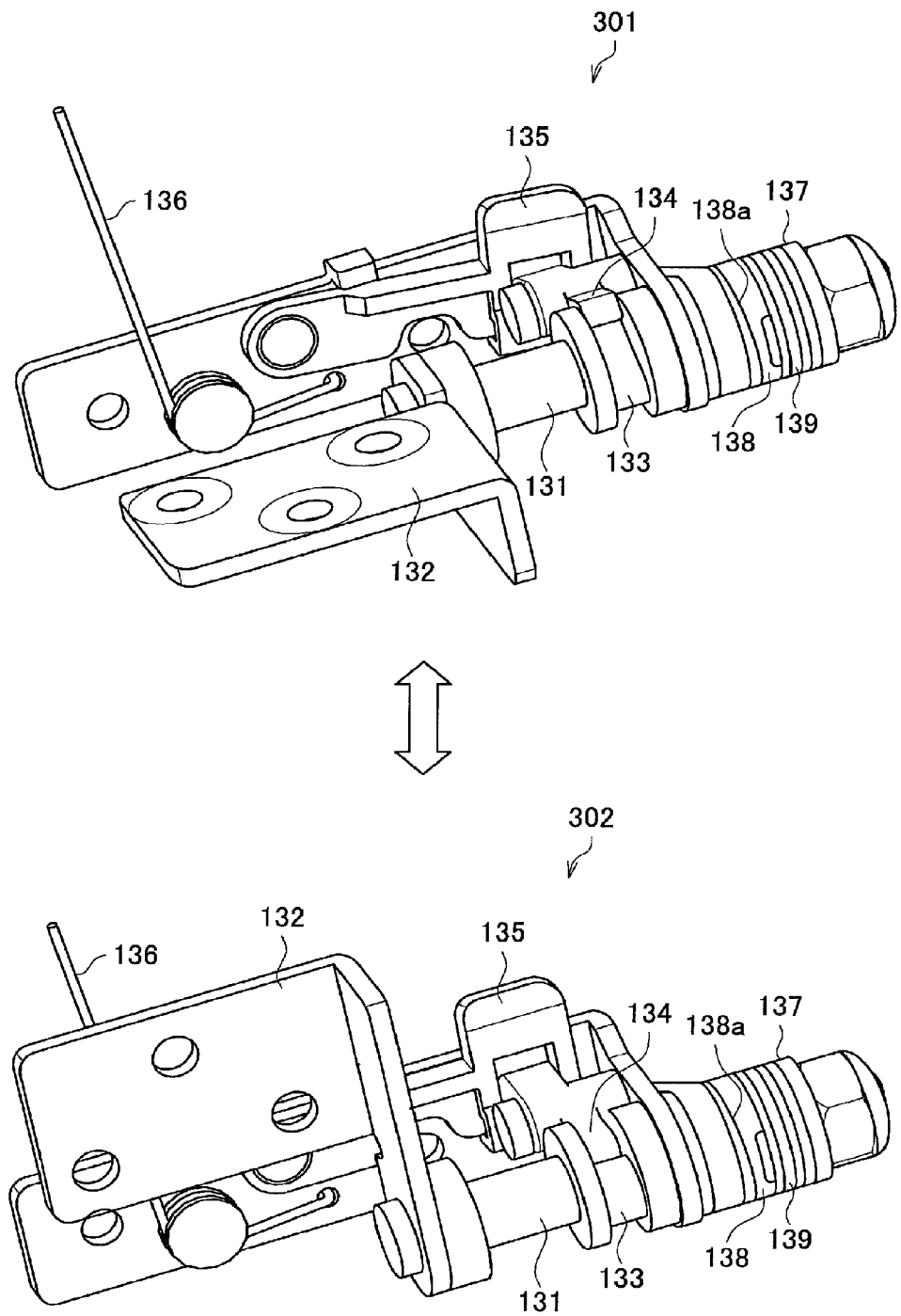
FIG. 27 is a figure for describing an operation example of the hinge mechanism section 130.
Figure 28:
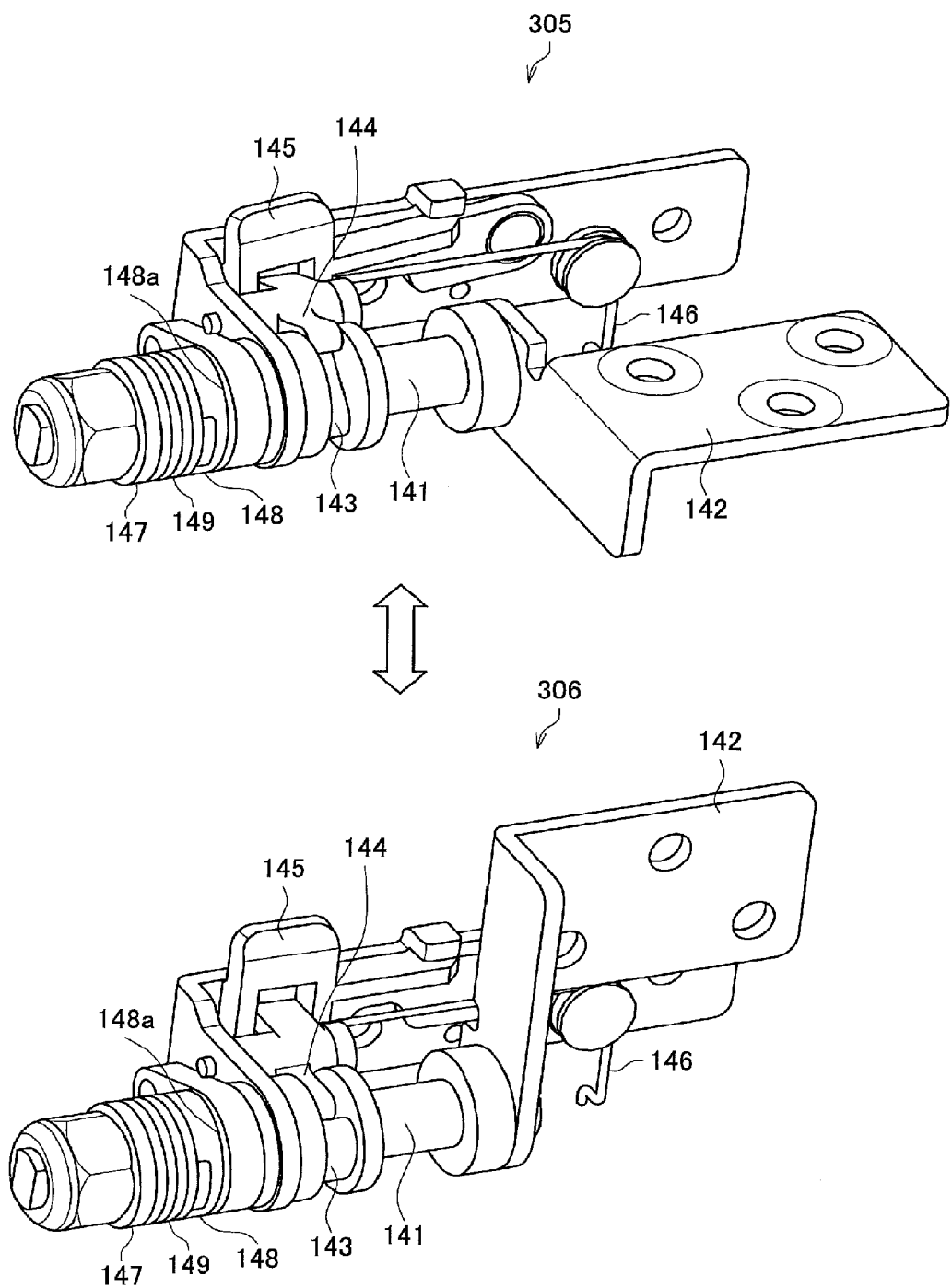
FIG. 28 is a figure for describing an operation example of the hinge mechanism section 140.

FIG. 21 is a cross-sectional view which shows a state of the hinge mechanism sections when the display side housing 110 is in the closed state. FIG. 22 is a perspective view which shows a state of the hinge mechanism sections when the display side housing 110 is in the closed state. FIG. 23 is a cross-sectional view which shows a state of the hinge mechanism sections when the display side housing 110 is in the opened state. FIG. 24 is a perspective view which shows a state of the hinge mechanism sections when the display side housing 110 is in the opened state. FIG. 25 is a perspective view which shows a detailed configuration of the hinge mechanism section 130. FIG. 26 is a perspective view which shows a detailed configuration of the hinge mechanism section 140. FIG. 27 is a figure for describing an operation example of the hinge mechanism section 130. FIG. 28 is a figure for describing an operation example of the hinge mechanism section 140.

As shown in FIG. 22, the hinge mechanism section 130 is included on one end side of the long direction of the main body side housing 120. As shown in FIG. 25, the hinge mechanism section 130 has a rotation shaft 131, a fixing part 132, a cam 133, a cam connection lever 134, a locking hook 135, a hook spring 136, and a variable hinge block 137 which is an example of a torque variation section.

The rotation shaft 131 rotates in accordance with the rotation of the display side housing 110. The fixing part 132 is a portion which rotatably supports the end of the rotation shaft 131, and is fixed to the main body side housing 120. The cam 133 is included in the rotation shaft 131, and forms an approximately semicircular shape. The cam 133 rotates in accordance with the rotation of the rotation shaft 131. The cam connection lever 134 interlockingly rotates with the rotation of the cam 133, in a state in contact with the cam 133.

The locking hook 135 is a locking member capable of shifting between a releasing position (state 301 of FIG. 24 and FIG. 27) and a locking position (state 302 of FIG. 22 and FIG. 27). When the display side housing 110 is positioned in the closed position, the locking hook 135 is positioned in the locking position. The hook spring 136 applies a prescribed energizing force to the locking hook 135, and positions the locking hook 135 in the releasing position. Note that, by pushing the cam connection lever 134 during rotation, the locking hook 135 will be positioned in the locking position with resistance to the energizing force of the locking hook 135.

The variable hinge block 137 allows the rotation torque (called hinge torque) to be changed in accordance with the rotation angle, when the display side housing 110 rotates with respect to the main body side housing 120. In order to change the hinge torque, the variable hinge block 137 has, for example, a variable cam 138 and a plate spring 139. The variable cam 138 rotates in accordance with the rotation of the rotation shaft 131. The variable cam 138 has a concave-convex part 138a, and the rotation position of the concave-convex part 138a changes in accordance with the rotation of the rotation shaft 131. The plate spring 139 applies a compressive force (the direction shown by the arrow in FIG. 25) to the variable cam 138. The compressive force changes in accordance with the rotation position of the concave-convex part 138a. The hinge torque will change due to such a change of the compressive force of the plate spring 139.

As shown in FIG. 22, the hinge mechanism section 140 is included on the other end side of the long direction of the main body side housing 120. As shown in FIG. 26, the hinge mechanism section 140 has a rotation shaft 141, a fixing part 142, a cam 143, a cam connection lever 144, a locking hook 145, a hook spring 146, and a variable hinge block 147. Note that, since the configuration and operation of the rotation shaft 141, the fixing part 142, the cam 143, the cam connection lever 144, the locking hook 145, the hook spring 146 and the variable hinge block 147 are the same as those of the rotation shaft 131, the fixing part 132, the cam 133, the cam connection lever 134, the locking hook 135, the hook spring 136 and a variable hinge block 137 of the hinge mechanism section 130 (refer to FIG. 28), a detailed description will be omitted.

Figure 29:
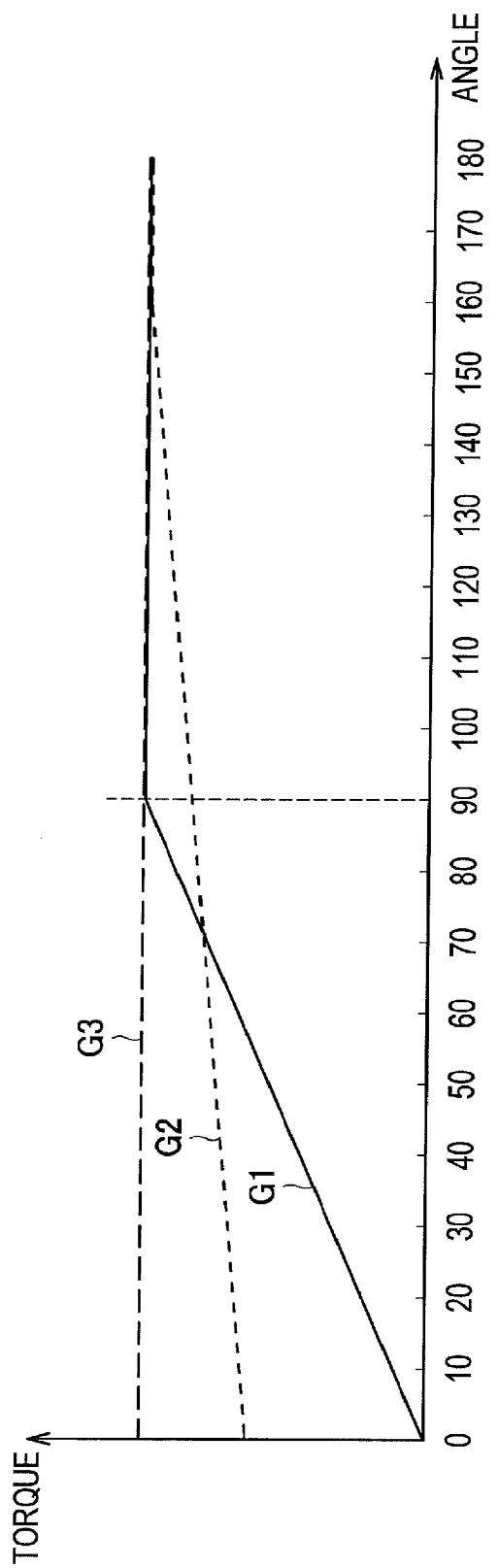
FIG. 29 is a graph which shows a relation between the rotation position of the display side housing 110 and the hinge torque.

Here, a relation between the rotation position of the display side housing 110 and the hinge torque will be described with reference to FIG. 29. FIG. 29 is a graph which shows a relation between the rotation position of the display side housing 110 and the hinge torque. The horizontal axis of the graph is an angle which shows the rotation state of the display side housing 110, and the vertical axis is a size of the torque. For example, in the case where the angle is 0, the display side housing 110 is positioned in the closed state shown in FIG. 3, and in the case where the angle is 90 degrees, the display side housing 110 is positioned in the opened state shown in FIG. 1.

G1 of FIG. 29 shows a change of the hinge torque according to the present embodiment. G2 shows a change of the hinge torque according to a modified example, and G3 shows a comparative example in which the there is no change in the hinge torque. As can be understood from G1, when the display side housing 110 is shifted from the closed state to the opened state, the hinge torque will change. Specifically, the hinge torque increases so as to be proportional to an increase of the rotation angle. Therefore, in the case where the rotation angle of the display side housing 110 is small, the user is allowed to rotate the display side housing 110 with a small force, and in the case where the rotation angle is large, the user is allowed to rotate the display side housing 110 with a large force. Note that, the change in hinge torque may be set so as to become G2 instead of the above described G1.

Figure 30:
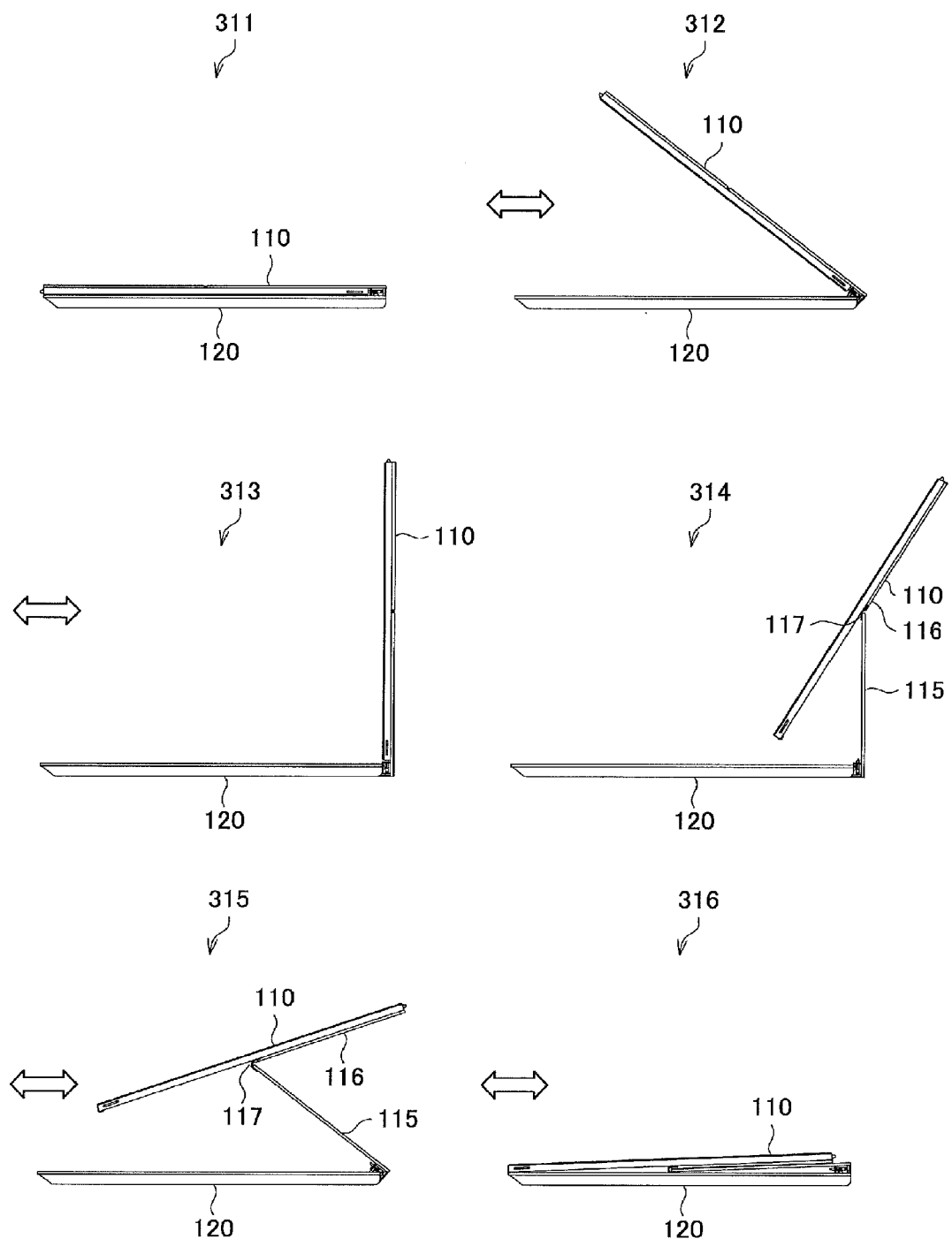
FIG. 30 is a figure for describing the flow of a rotation operation of the electronic apparatus 100 between the closed state and the reversed state.

1-4. Rotation Operation of the Electronic Apparatus 100 Between the Closed State and the Reversed State A rotation operation of the electronic apparatus 100 between the closed state and the reversed state will be described with reference to FIG. 30. FIG. 30 is a figure for describing the flow of a rotation operation of the electronic apparatus 100 between the closed state and the reversed state.

Hereinafter, a rotation operation of the electronic apparatus 100, when the user is allowed to change the electronic apparatus 100 from the closed state to the reversed state, will be described. Here, the display side housing 110 is positioned in the closed state (state 311). Then, the user is allowed to rotate the display side housing 110 clockwise with respect to the main body side housing 120 via the hinge mechanism sections 130 and 140 (state 312), and the electronic apparatus 100 switches over to the opened state (state 313). In this case, the hinge torque changes in accordance with the rotation angle of the display side housing 110 such as described above. Further, the display section 112 maintains a state of being retained on the first support section 115 by the magnets 173a and 173b (FIG. 15) of the first support section 115. Further, the connection bending section 117 is not bent.

Next, the user is allowed to rotate the second support section 116 of the display side housing 100 positioned in the opened state so that the connection bending section 117 bends (state 314). In this case, the display section 112 rotates with resistance to the attractive force by the magnets 173a and 173b. Note that, since the connection bending section 117 has flexibility, the second support section 116 rotates by bending the connection bending section 117 with the application of a small force. On the other hand, since the hinge torque will be large in the opened state such as described above, the first support section 115 does not rotate, even if a small force is applied.

Afterwards, the user applies a force, so that the first support section 115 of the display side housing 110 rotates in a counter-clockwise direction (state 315), while further bending the connection bending section 117. Afterwards, when the user applies an additional force, the display side housing 110 will transition to the reversed state (state 316).

Note that, when the user changes the electronic apparatus 100 from the reversed state to the closed state, the electronic apparatus 100 performs operations in reverse to the above described rotation operations.

1-5. Conclusion

As described above, the display side housing 110, which is rotatably connected to the main body side housing 120 via the hinge mechanism sections 130 and 140, has a support plate 114 which supports the display section 112. Also, the support plate 114 includes a first support section 115 connected to the hinge mechanism section 130, a second support section 116 which supports the display section 112, and a connection bending section 117 which has a flexibility to rotatably connect the second support section 116 with respect to the first support section 115.

According to such a configuration, the display side housing 110 can be allowed to rotate in a plurality of rotation states, via the hinge mechanism sections 130 and 140 and the connection bending section 117. Further, since the connection bending section 117 has a simple configuration which is different to the hinge mechanism sections 130 and 140, and has a thickness which can be reduced, an increase in the thickness of the display side housing 110 can be suppressed.

Further, since the connection bending section 117 easily bends with a small force when compared to the hinge mechanism sections 130 and 140, the connection bending section 117 can rotate the second support section 116, which fixedly supports the display section 112, in a state in which the first support section 115 stops in the opened state. In this way, a user can be allowed to easily rotate the display section 112 in a desired rotation state, without worrying about the rotation of the first support section 115.

In addition, since the thickness of the first support section 115 and the second support section 116 can be made the same, by having the connection bending section 117 connect the first support section 115 and the second support section 116, the support plate 114 can be made as a flat top plate.

2. The Second Embodiment

An example of the configuration of the electronic apparatus 100 according to a second embodiment of the present disclosure will be described with reference to FIG. 31 to FIG. 33.

Figure 31:
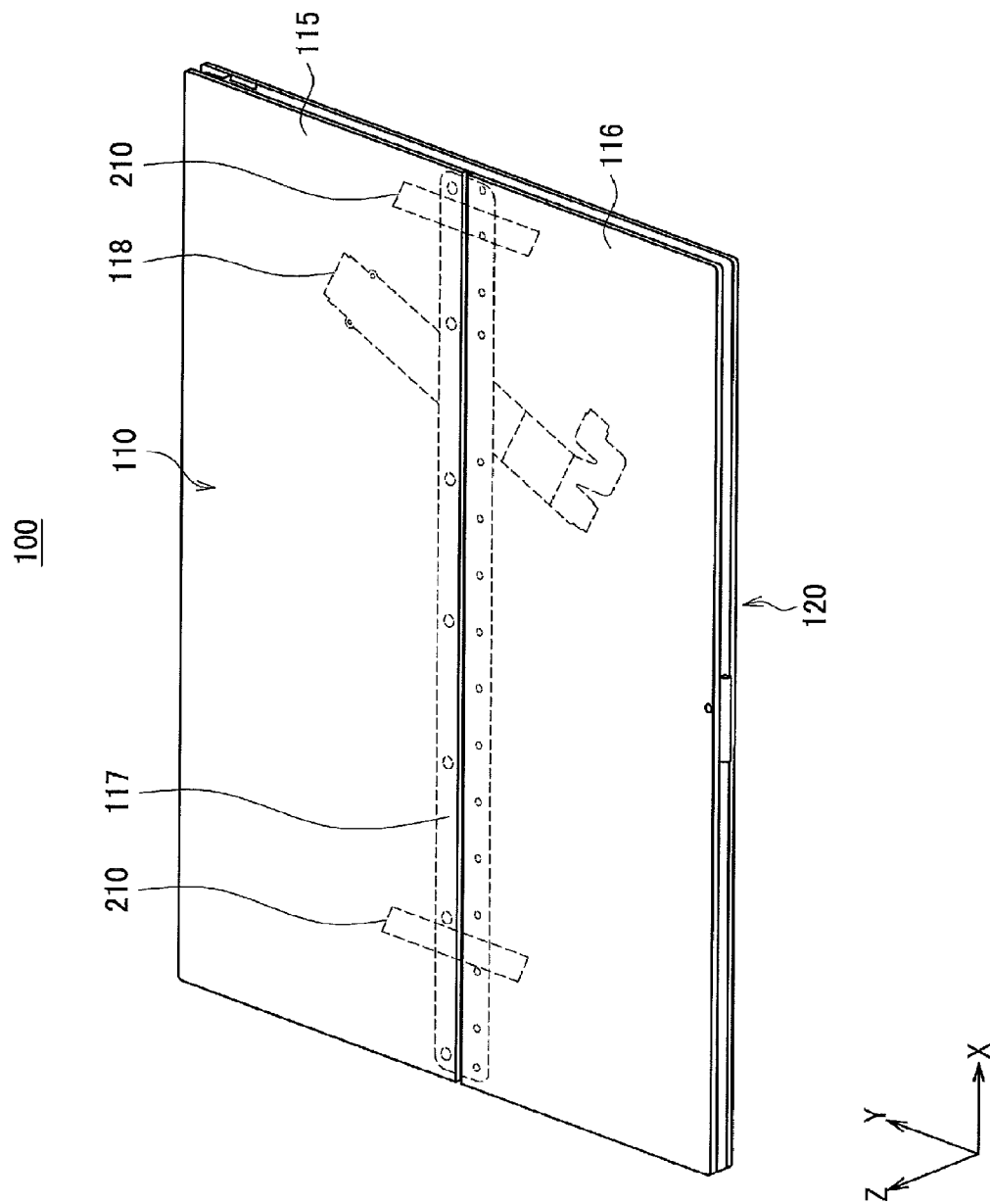
FIG. 31 is a perspective view which shows an example of the configuration of the electronic apparatus 100 according to a second embodiment of the present disclosure.

FIG. 31 is a perspective view which shows an example of the configuration of the electronic apparatus 100 according to the second embodiment. FIG. 32 is a plan view which shows an example of the internal configuration of the display side housing 110 according to the second embodiment. FIG. 33 is a cross-sectional view which shows an example of the configuration of the connection bending section 117 according to the second embodiment.

Figure 33:
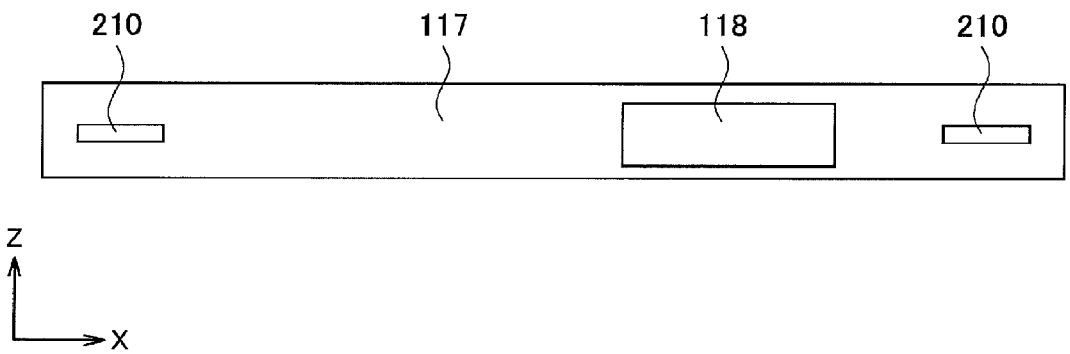
FIG. 33 is a cross-sectional view which shows an example of the configuration of the connection bending section 117 according to the second embodiment.

In the second embodiment, sheet shaped energization members 210 such as shown in FIG. 33 are embedded inside of both end sides of the long direction (the X direction of FIG. 31) of the connection bending section 117. The energization members 210 are, for example, FPCs (Flexible printer circuits). The energization members 210 are thinner than the connection bending section 117, and pass through the inside of the connection bending section 117 along the short direction (the Y direction of FIG. 31) of the connection bending section 117. By including such energization members 210, expansion of the connection bending section 117, which is formed by a soft material, in the short direction can be suppressed. In particular, expansion of the connection bending section 117 in the short direction can be suppressed when the second support section 116 rotates with respect to the first support section 115 via the connection bending section 117.

Since the connection bending section 117 is a sheet shaped member such as described above, the thickness will be thin. The sheet shaped energization members 210 are effective as they are allowed to pass through the inside of such a thin connection bending section 117.

Figure 32:
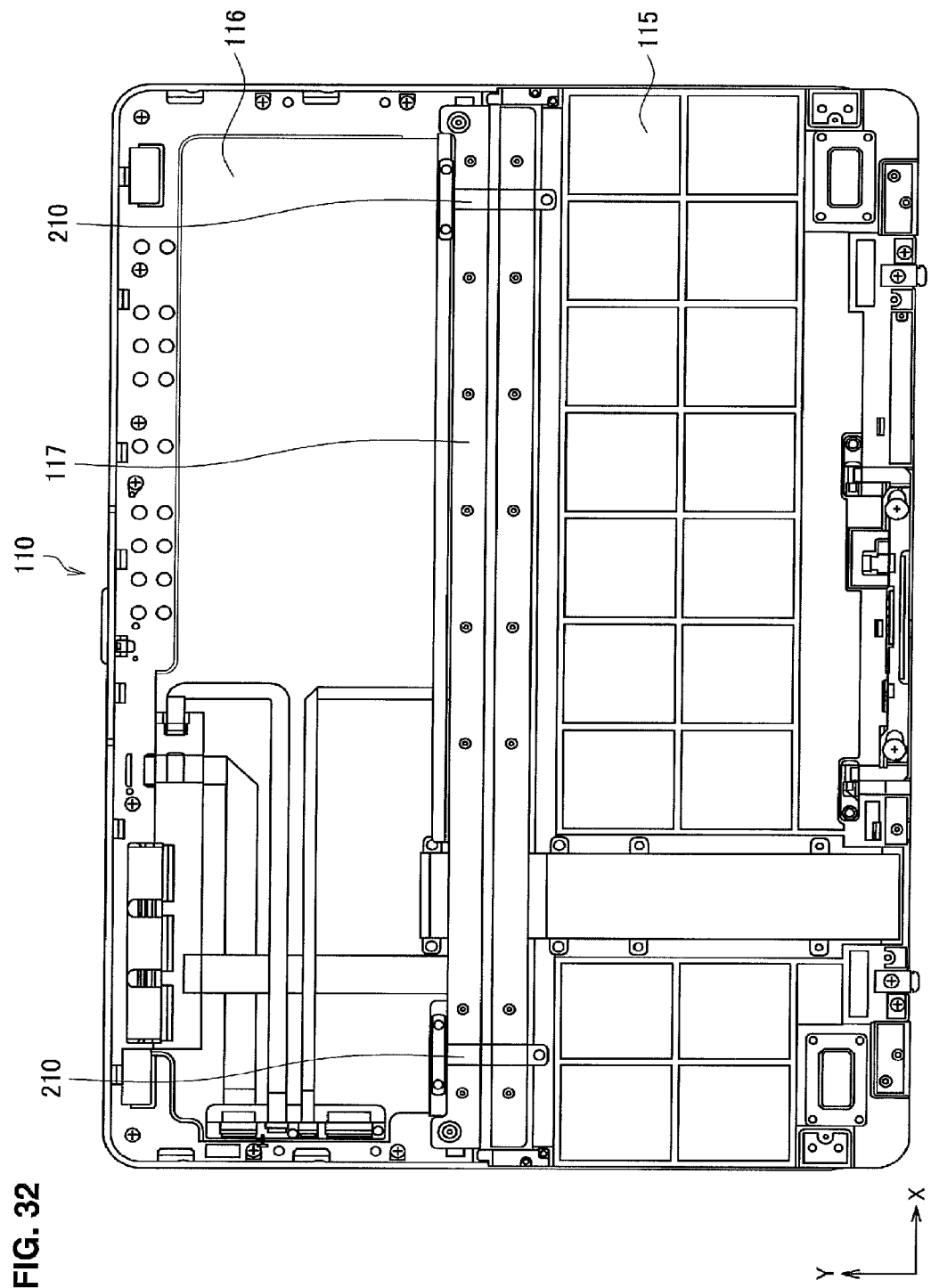
FIG. 32 is a plan view which shows an example of the internal configuration of the display side housing 110 according to the second embodiment.

Further, as shown in FIG. 32, the energization members 210 connect the first support section 115 and the second support section 116, which are metallic plates. In this way, since the energization members 210 can perform electrical energization between the first support section 115 and the second support section 116, it becomes possible to strengthen the ground (GND) in the display side housing 110.

3. The Third Embodiment

An example of the configuration of the electronic apparatus 100 according to a third embodiment of the present disclosure will be described with reference to FIG. 34 to FIG. 36.

Figure 34:
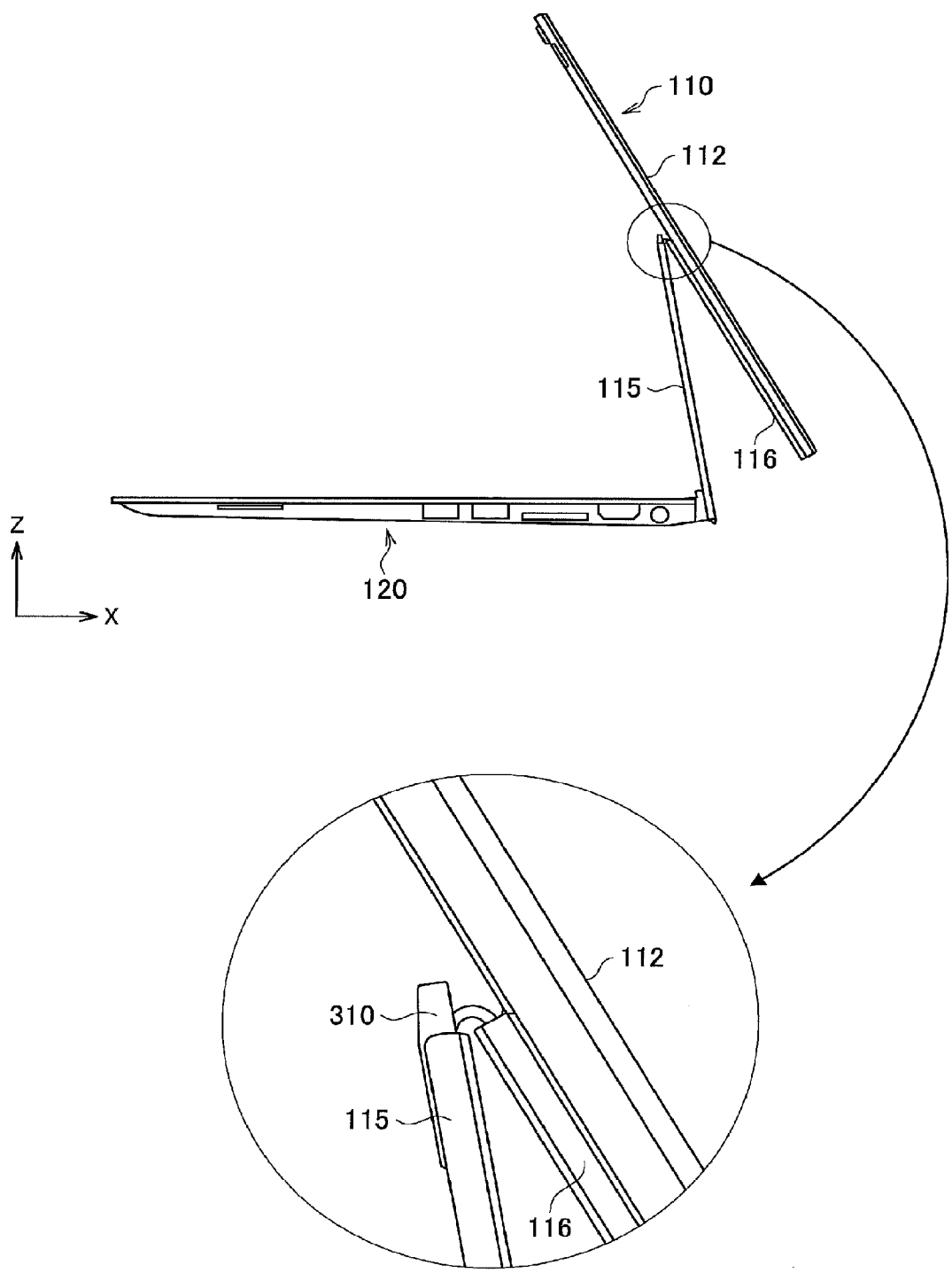
FIG. 34 is a side view which shows an example of the configuration of the electronic apparatus 100 according to a third embodiment of the present disclosure.

FIG. 34 is a side view which shows an example of the configuration of the electronic apparatus 100 according to the third embodiment. FIG. 35 is a figure which shows an example of the configuration of a seizing section 310 according to the third embodiment. FIG. 36 is a figure which shows a relation between the seizing section 310 and the second support section 116 when the second support section 116 is rotated.

As described in the first embodiment, the electronic apparatus 100 transitions to the reversed state shown in FIG. 13 and FIG. 14, by bending the connection bending section 117 (the display section 112 is reversed in accordance with this), from the opened state shown in FIG. 1 and FIG. 2. Hereinafter, the position prior to the reversing of the display section 112 shown in FIG. 1 will be called a standard position, and the position after the reversing of the display section 112 shown in FIG. 13 will be called a reverse position. Note that, in the third embodiment, the standard position corresponds to a support position in which the display section 112 is supported by the first support section 115. Further, the position to which the display section 112 rotates from the standard position (for example, the position shown in FIG. 34) corresponds to a separation position.

Incidentally, when the display section 112 is positioned in the standard position shown in FIG. 1, a problem such as follows will occur. The first support section 115 is connected to the hinge mechanism sections 130 and 140 (refer to FIG. 1), and shifts in a direction D1 (refer to FIG. 36) shown in FIG. 35 by the torque of the hinge mechanism section 130. On the other hand, the second support section 116 supports the display section 112, and shifts in a direction D2 (refer to FIG. 36) in an opposite direction to the direction D1 by its own weight. Since such a first support section 115 and second support section 116 shift in mutually different directions, there is the possibility that a difference may occur in the connection bending section 117 when the display section 112 is positioned in the standard position.

Figure 35:
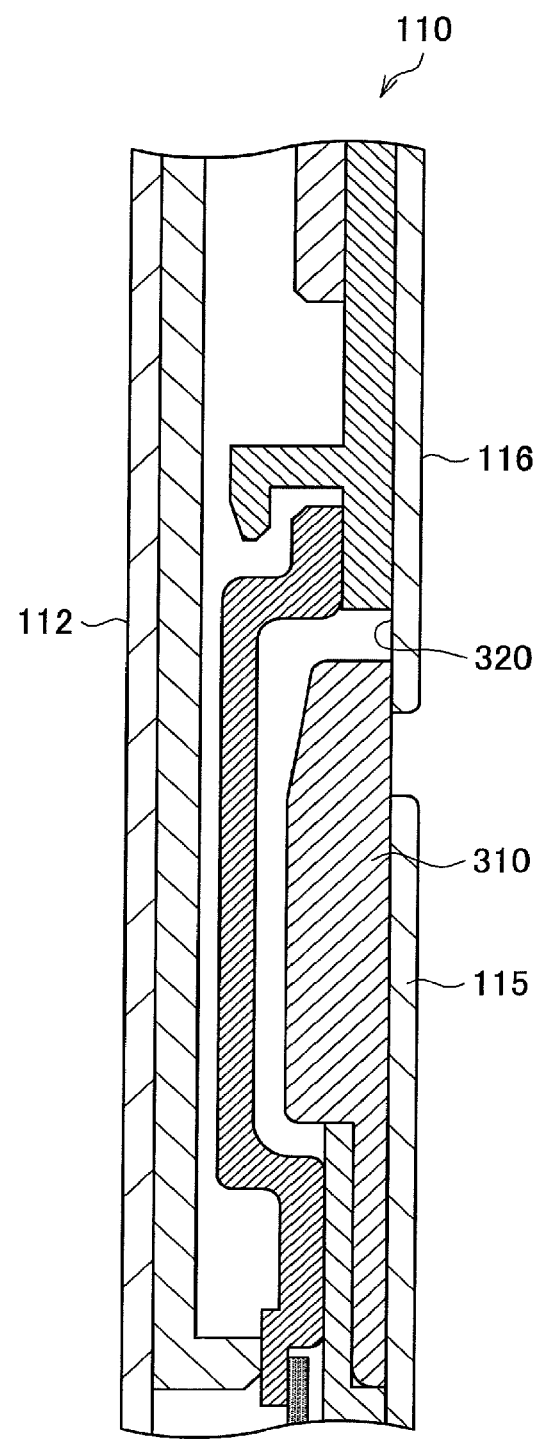
FIG. 35 is a figure which shows an example of the configuration of seizing sections 310 according to the third embodiment.

In the third embodiment, in order to prevent such a difference, a seizing section 310, which engages with the second support section 116 when the display section 112 is positioned in the standard position, such as shown in FIG. 34 and FIG. 35, is included on the end parts of the second support section 116 side of the first support section 115. The seizing section 310 is included on both outer sides of the connection bending section 117, which are both end sides of the long direction of the display side housing 110. Further, the locking sections 310 are made of a resin.

Figure 36:
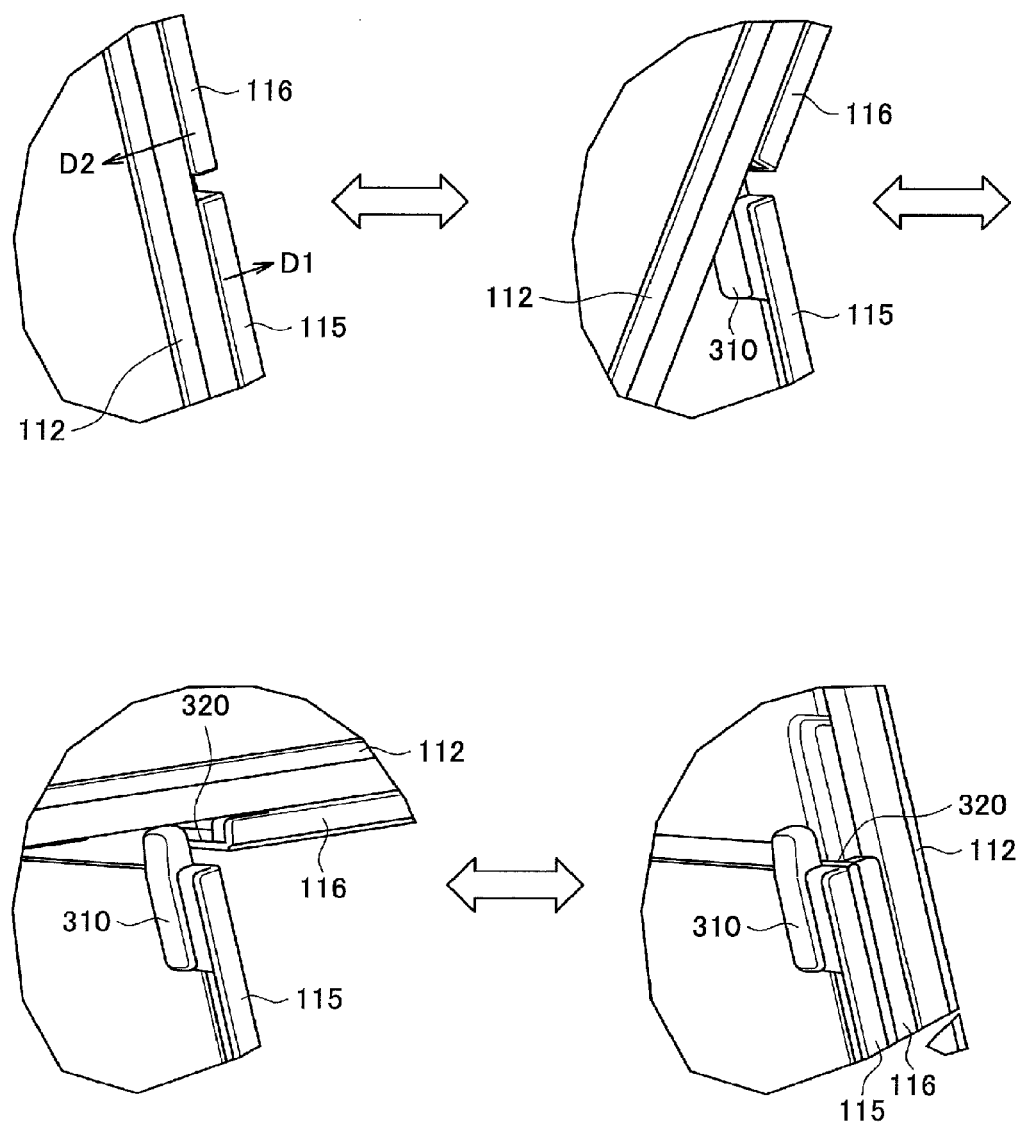
FIG. 36 is a figure which shows a relation between the seizing sections 310 and a second support section 116 when the second support section 116 is rotated.

As shown in FIG. 36, when the display section 112 shifts to the standard position, the seizing section 310 fits into and engage with a seizing groove 320 of the second support section 116. Also, since shifting in the direction D1 of the first support section 115, and shifting in the direction D2 of the second support section 116, can be restricted by having the seizing section 310 engage with the second support section 116, the occurrence of a difference can be prevented.

Note that, in the case where the electronic apparatus 100 is positioned in the closed state shown in FIG. 3 or FIG. 4, the seizing section 310 is positioned on the outer side of a keyboard in the long direction of the main body side housing 120. Therefore, pushing of the operation keys of the keyboard by the seizing section 310 can be prevented. Further, since the seizing section 310 is made of a resin, damage can be prevented to the appearance of the parts of the upper surface of the main body side housing 120 positioned on the outside of the keyboard.

4. The Fourth Embodiment

An example of the configuration of the electronic apparatus 100 according to a fourth embodiment of the present disclosure will be described by referring to FIG. 37 to FIG. 43.

Figure 37:
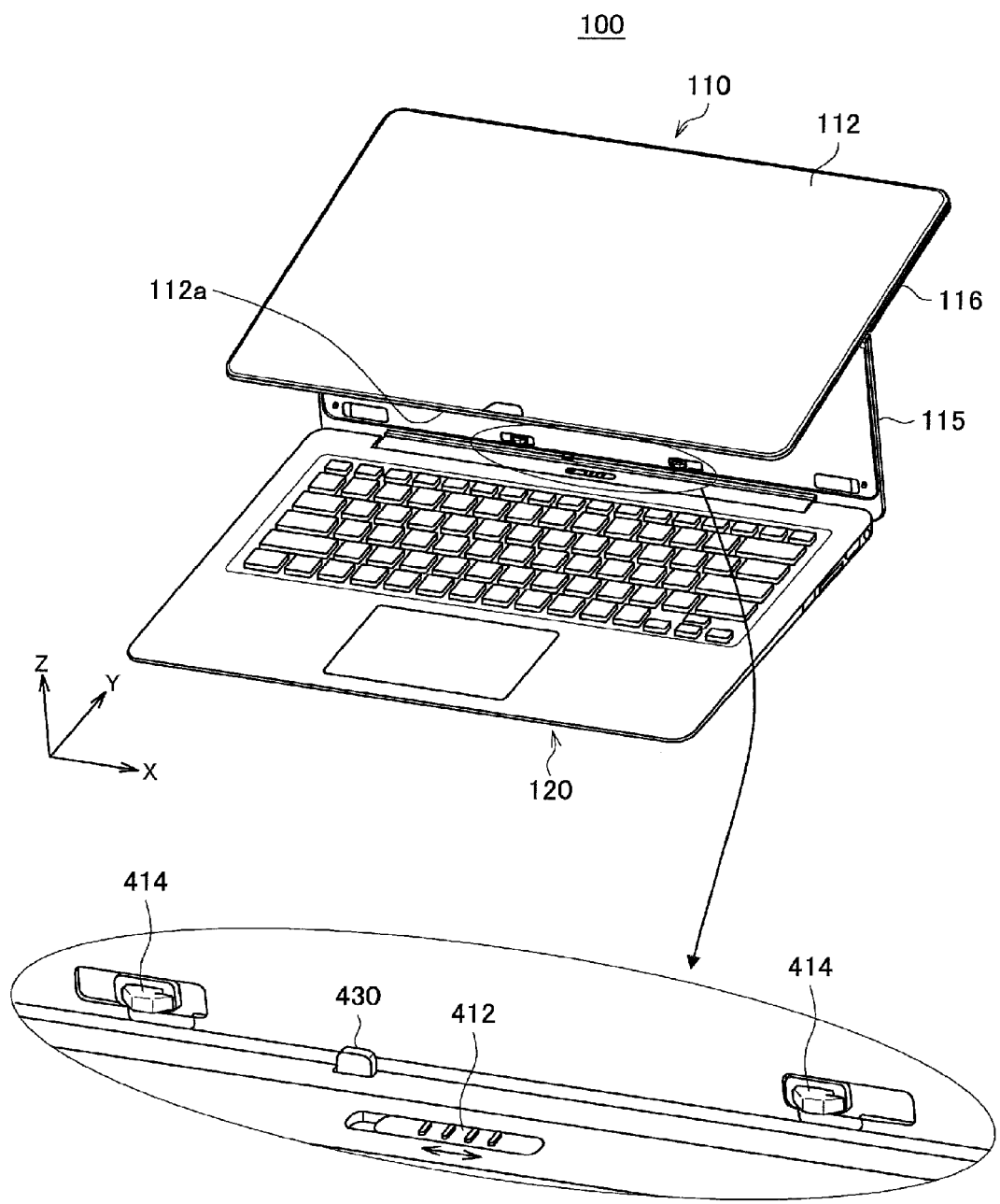
FIG. 37 is a perspective view which shows an example of the configuration of the electronic apparatus 100 according to a fourth embodiment of the present disclosure.
Figure 38:
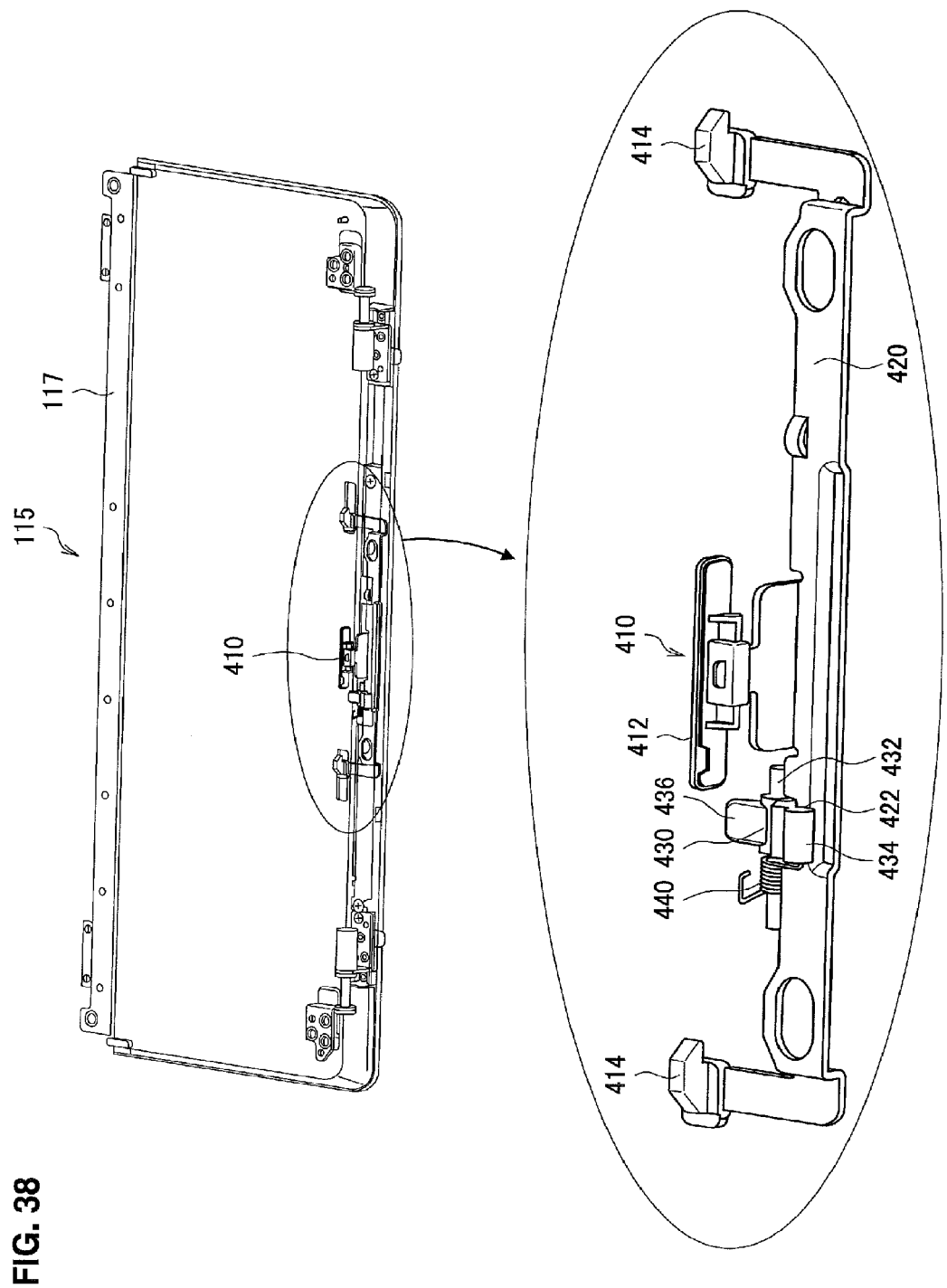
FIG. 38 is a perspective view which shows an example of the configuration of a locking mechanism 410 according to the fourth embodiment.
Figure 39:
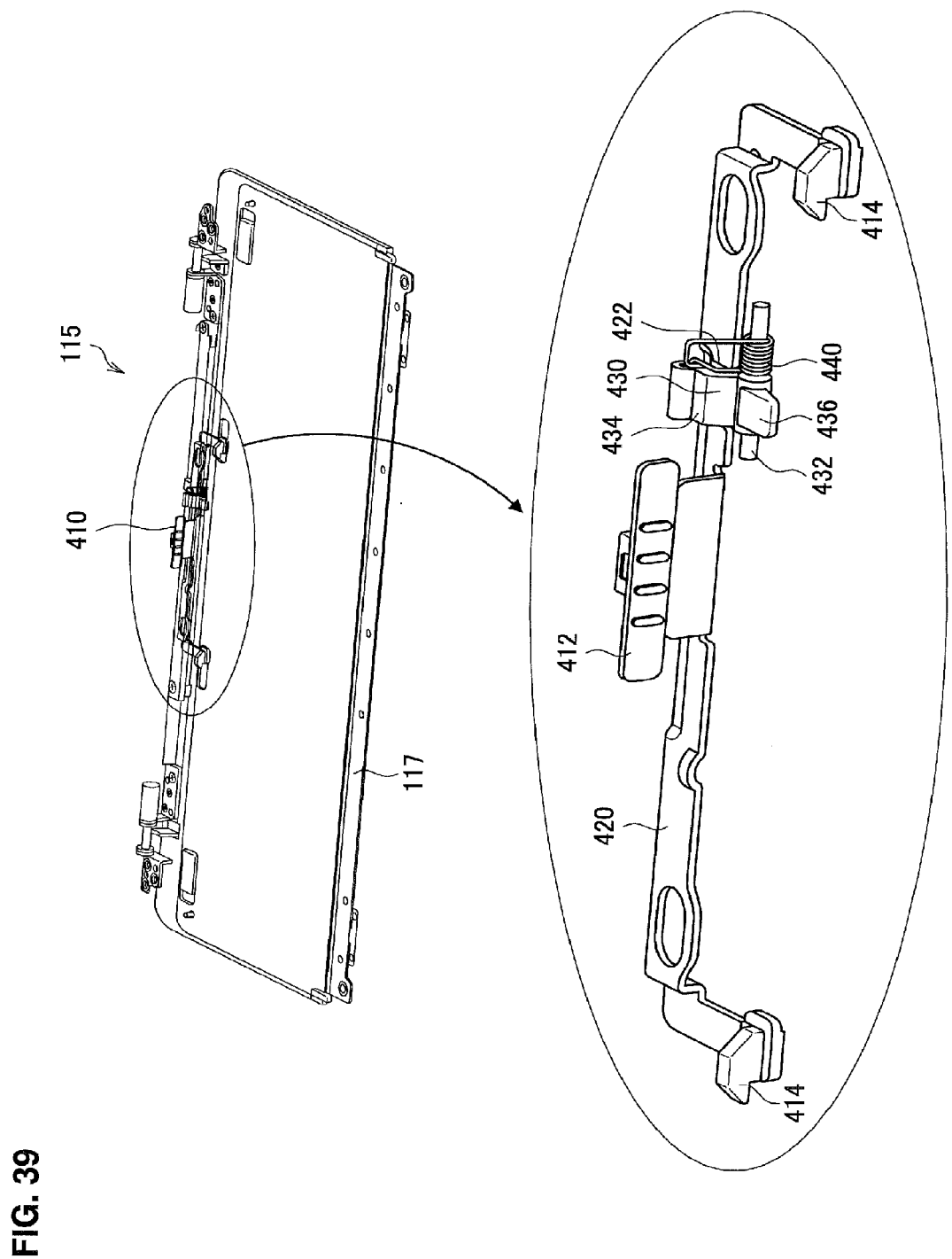
FIG. 39 is a perspective view which shows an example of the configuration of the locking mechanism 410 according to the fourth embodiment.
Figure 40:
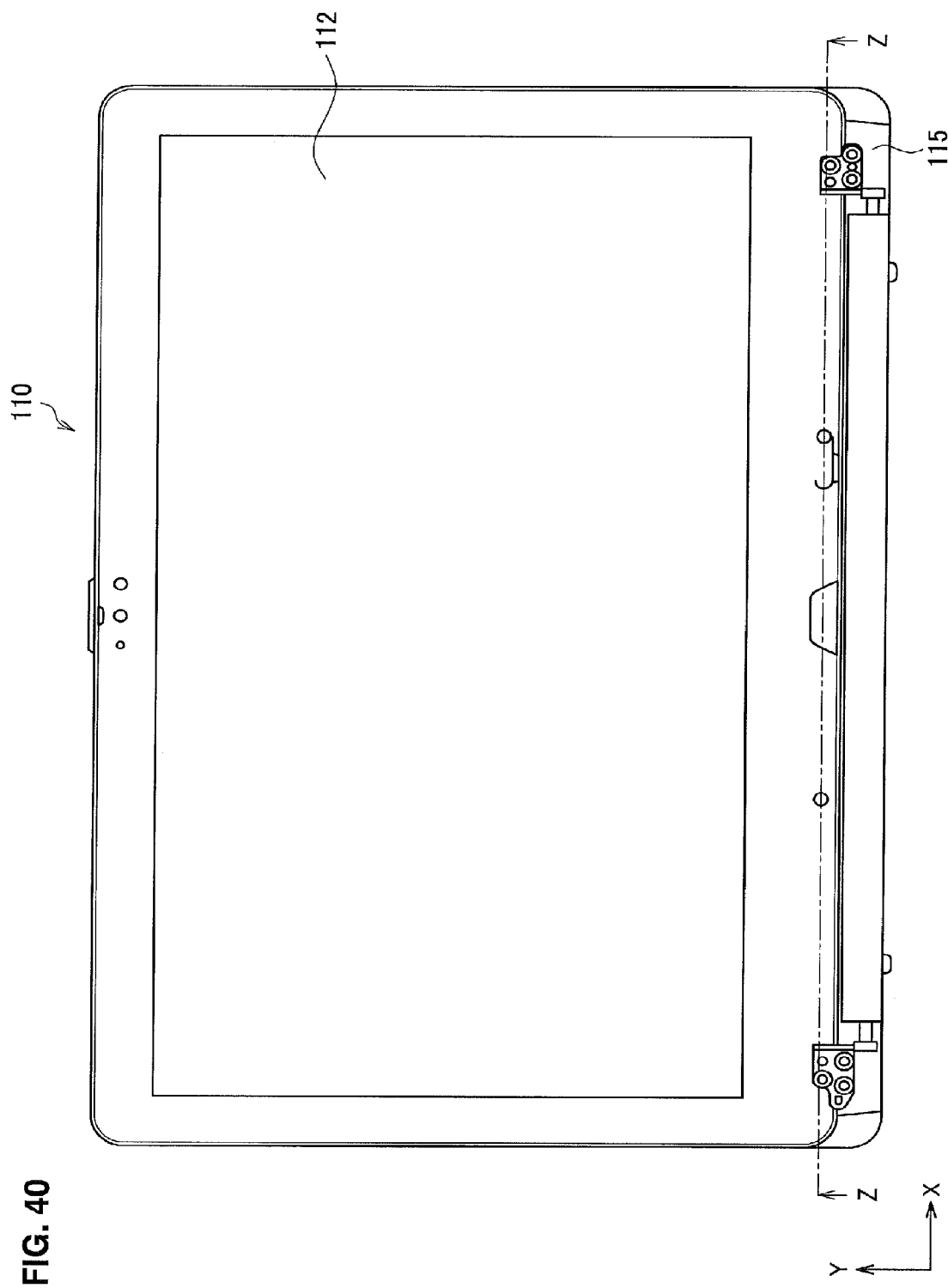
FIG. 40 is a plan view which shows a state in which the display section 112 according to the fourth embodiment is locked.
Figure 41:
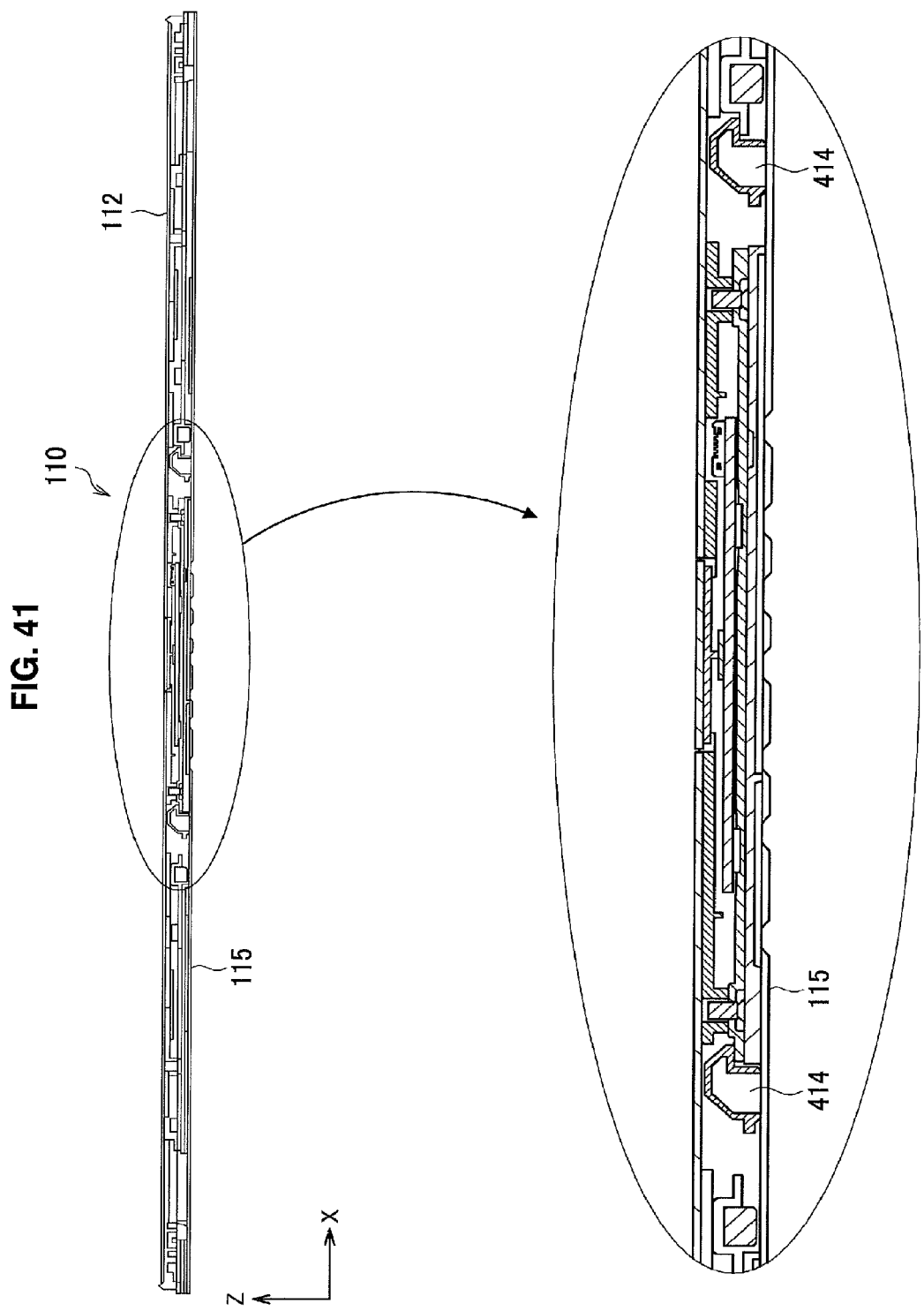
FIG. 41 is a Z-Z perspective view of FIG. 40.
Figure 42:
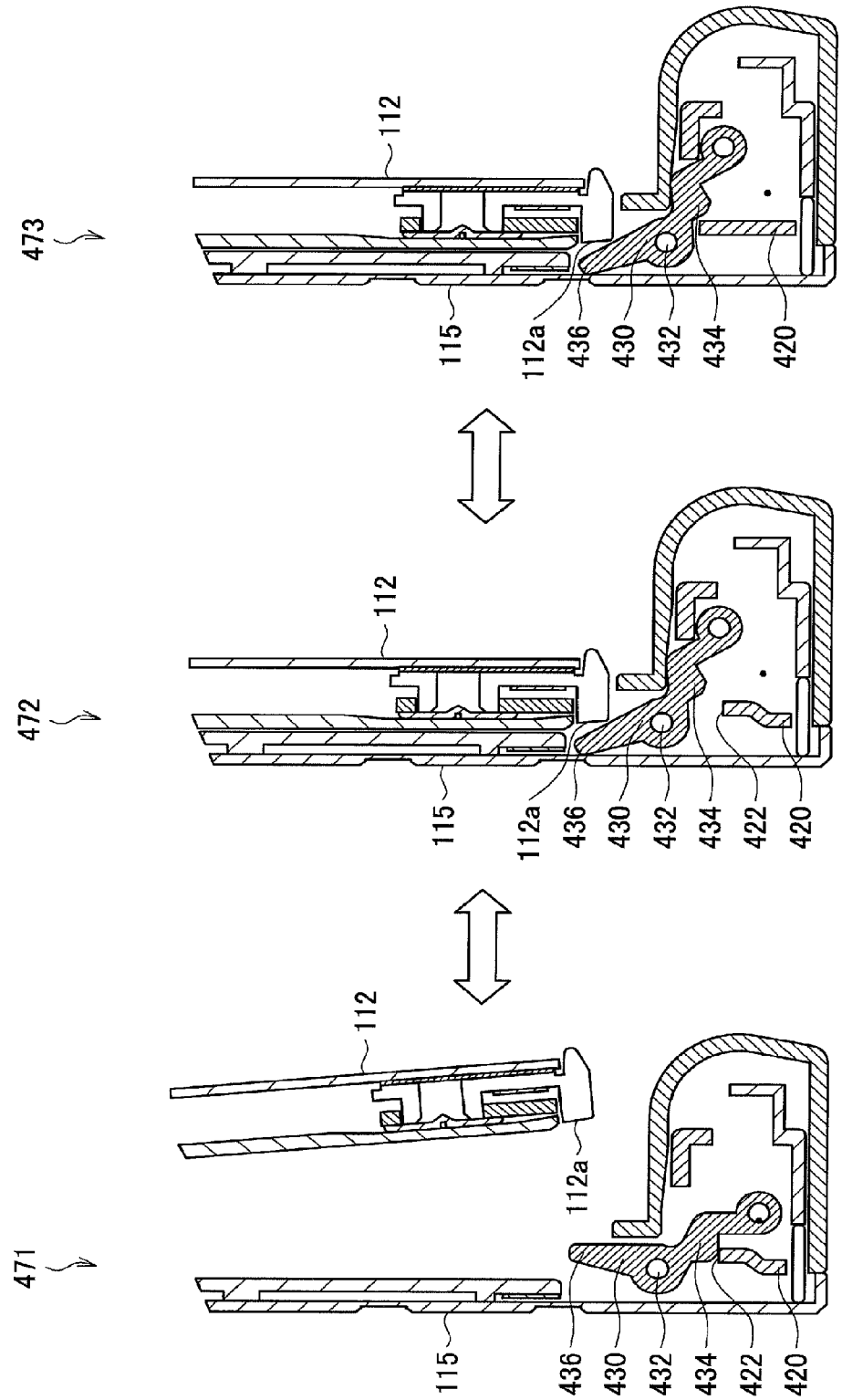
FIG. 42 is a cross-sectional view which shows an example of the operation of the locking mechanism 410 according to the fourth embodiment.
Figure 43:
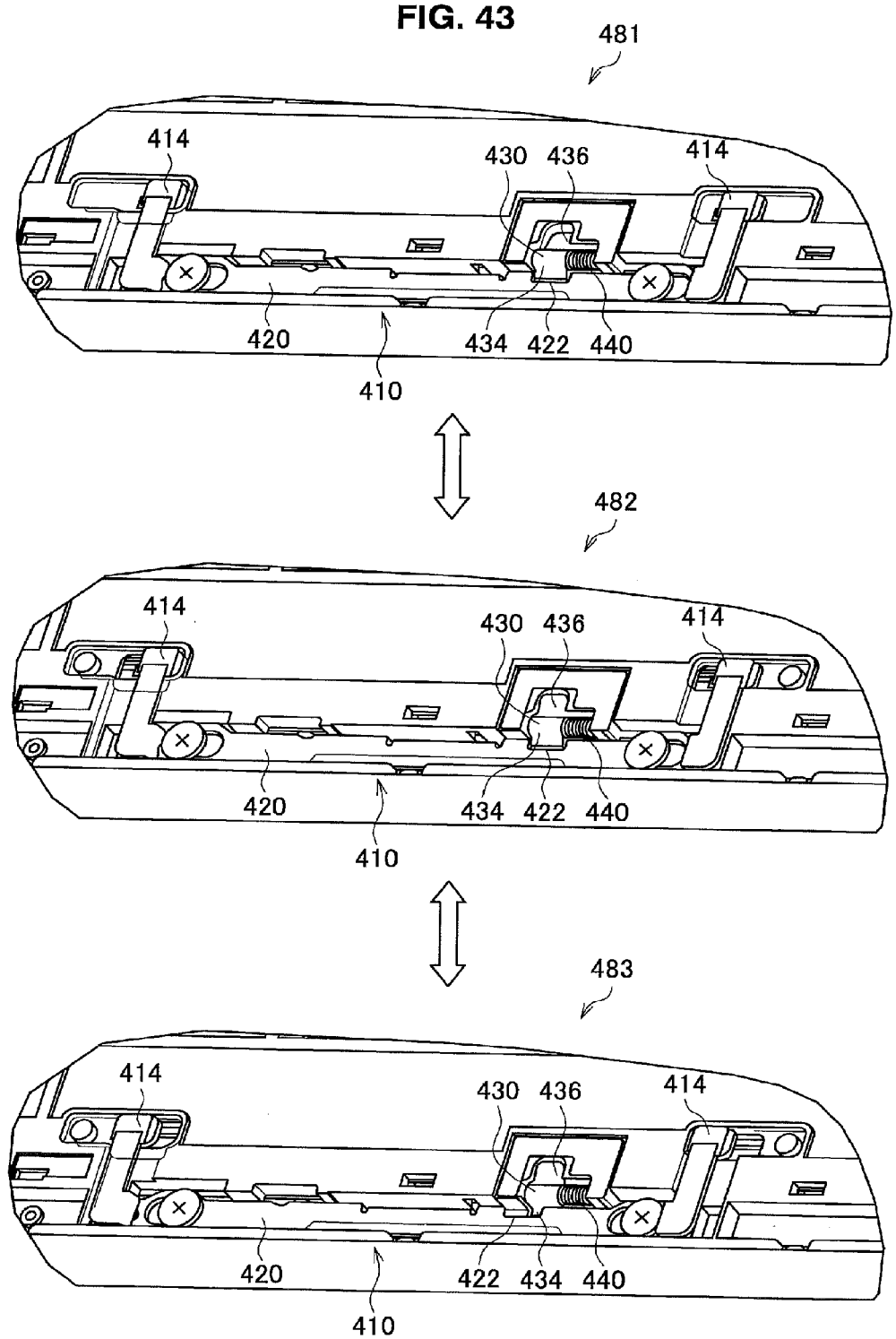
FIG. 43 is a perspective view which shows an example of the operation of the locking mechanism 410 according to the fourth embodiment.

FIG. 37 is a perspective view which shows an example of the configuration of the electronic apparatus 100 according to the fourth embodiment. FIG. 38 is a perspective view which shows an example of the configuration of a locking mechanism 410 according to the fourth embodiment. FIG. 39 is a perspective view which shows an example of the configuration of the locking mechanism 410 according to the fourth embodiment. FIG. 40 is a plan view which shows a state in which the display section 112 according to the fourth embodiment is locked. FIG. 41 is a Z-Z perspective view of FIG. 40. FIG. 42 is a cross-sectional view which shows an example of the operation of the locking mechanism 410 according to the fourth embodiment. FIG. 43 is a perspective view which shows an example of the operation of the locking mechanism 410 according to the fourth embodiment. Note that, the state 481 of the locking mechanism 410 shown in FIG. 43 corresponds to the state 471 shown in FIG. 42. Similarly, the state 482 of the locking mechanism 410 corresponds to the state 472, and the state 483 corresponds to the state 473.

As described above, the display section 112 transitions between the standard position (FIG. 1) and the reverse position (FIG. 13), by having the second support section 116 rotate with respect to the first support section 115. Also, in the fourth embodiment, the first support section 115 has a locking mechanism 410 which allows the display section 112 positioned in the standard position to be locked. As shown in FIG. 37 to FIG. 39, the locking mechanism 410 has a locking button 412, locking claws 414, a sheet metal member 420, and a locking lever 430. Note that, in the fourth embodiment, the locking claws 414 correspond to locking sections, and the locking lever 430 corresponds to a restriction section.

The locking button 412 is an operation button capable of shifting in the direction of the arrow shown in FIG. 37, by an operation of a user. The locking button 412 is attached to the center side of the long direction of the sheet metal member 420 such as shown in FIG. 38, and interlockingly shifts in the operation direction of the locking button 412. By operating (shifting) the locking button 412 when the display section 112 is positioned in the standard position, the user can be allowed to lock the display section 112.

The locking claws 414 allow the display section 112 to be locked, by engaging with the rear surface side of the display section 112 positioned in the standard position. The locking claws 414 are attached to both end sides of the long direction of the sheet metal member 420 such as shown in FIG. 38, and interlockingly shift in the operation direction of the locking button 412. In this way, the locking claws 414 shift between a locking position in which the display section 112 positioned in the standard position is allowed to be locked (the position shown in FIG. 41), and the opening position in which the display section 112 is capable of moving from the standard position to the reverse position.

The sheet metal member 420 is a sheet shaped member included inside of the first support section 115 along the long direction (the X direction of FIG. 37) of the first support section 115. The sheet metal member 420 shifts in the long direction, by interlocking in the operation direction of the locking button 412. Further, a locking groove 422 with which the locking lever 430 engages is formed in the sheet metal member 420. In the case where the locking lever 430 is engaged with the locking groove 422, the sheet metal member 420 is not able to be shifted (in other words, the locking button 412 is not able to be operated).

It is possible for the locking lever 430 to move around a shaft 432 supporting the sheet metal member 420. The locking lever 430 has a locking section 434 capable of engaging with the locking groove 422 of the sheet metal member 420 such as shown in FIG. 38. The locking section 434 engages with the locking groove 422 (state 471 of FIG. 42, state 481 of FIG. 43), by having the locking lever 430 apply an energizing force to the spring 440 attached to the shaft 432. Further, a pedal section 436 pressed onto an end section 112a (refer to FIG. 42) of the display section 112, when the display section 112 is positioned in the standard position, is formed in the locking lever 430. By pressing with the pedal section 436, the locking of the locking groove 422 of the locking section 434 is released by having the locking lever 430 rotate around the shaft 432 (state 472 of FIG. 42, state 482 of FIG. 43). By releasing such a locking of the locking groove 422 of the locking section 434, it becomes possible for the sheet metal member 420 (the locking button 412) to be shifted. As a result, the locking claws 414 can be shifted from the opening position to the locking position (state 473 of FIG. 42, state 483 of FIG. 43), and can lock the display section 112 positioned in the standard position.

On the other hand, when the locking of the display section 112 is released (that is, in a state in which the locking claws 414 are positioned in the opening position), and the display section 112 shifts from the standard position (the state shown in FIG. 37), shifting to the locking position of the locking claw 414 is restricted. Specifically, the locking claws 414 (locking button 412) are maintained in the opening position without being able to shift. In such a case, since shifting of the display section 112, in a state in which the locking claws 414 are shifted to the locking position, to the standard position can be prevented, damage by the display section 112 colliding with the locking claws 414 positioned in the locking position can be prevented. Further, by having the locking claws 414 maintained in the opening position, it may become unnecessary for a user to shift the locking claws 414 to the opening position when the display section 112 is locked. Further, it may become unnecessary to operate the locking button 412 during the rotation of the display section 112, and a finger being caught between the display section 112 and the locking button 412 can be prevented. Therefore, according to the configuration of the fourth embodiment, the operability when locking the display section 112 will be improved.

5. The Fifth Embodiment

An example of the configuration of the electronic apparatus 100 according to a fifth embodiment of the present disclosure will be described with reference to FIG. 44 to FIG. 47.

Figure 44:
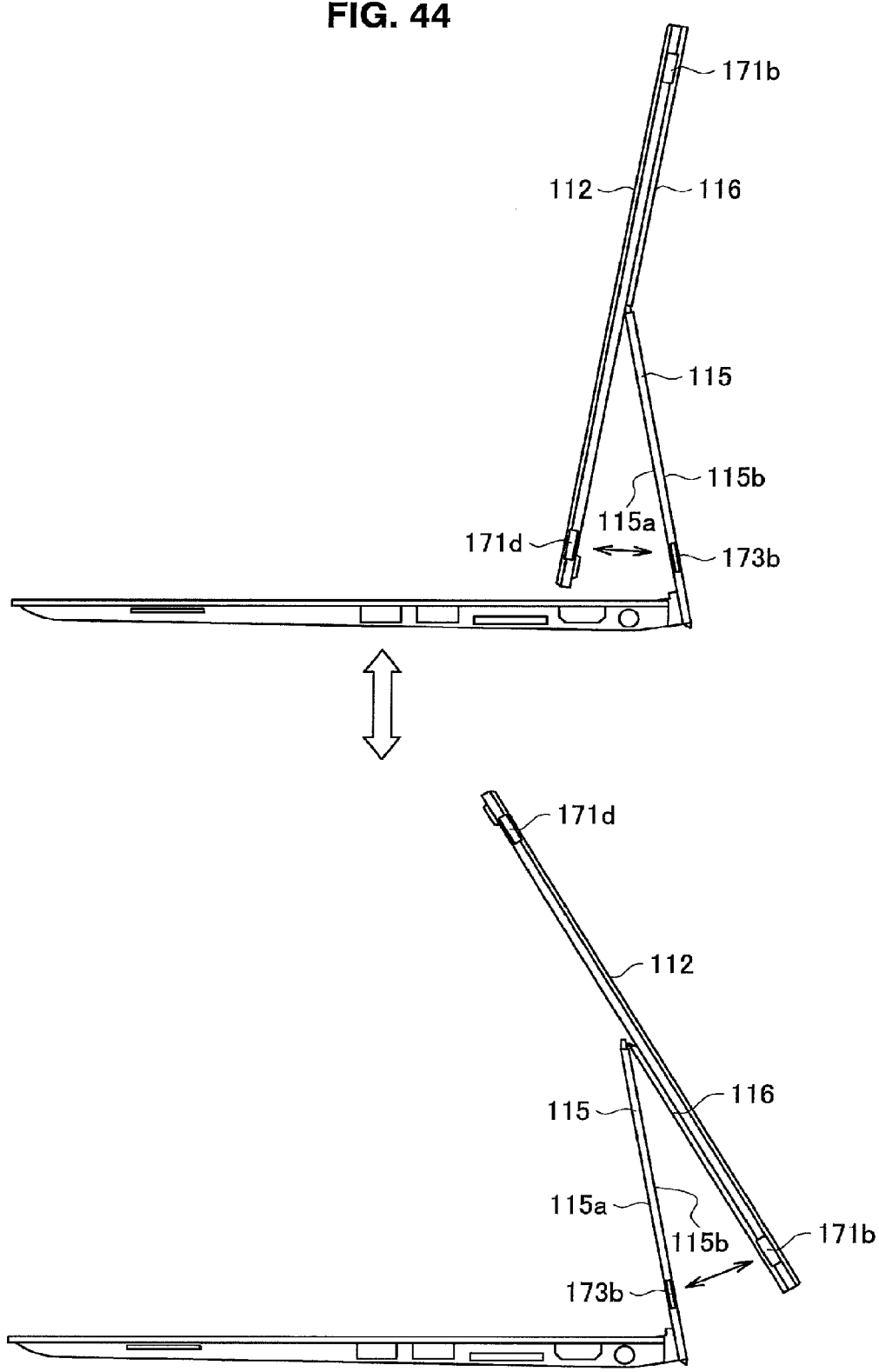
FIG. 44 is a figure for describing retention by magnets of the display section 112 according to a fifth embodiment of the present disclosure.
Figure 45:
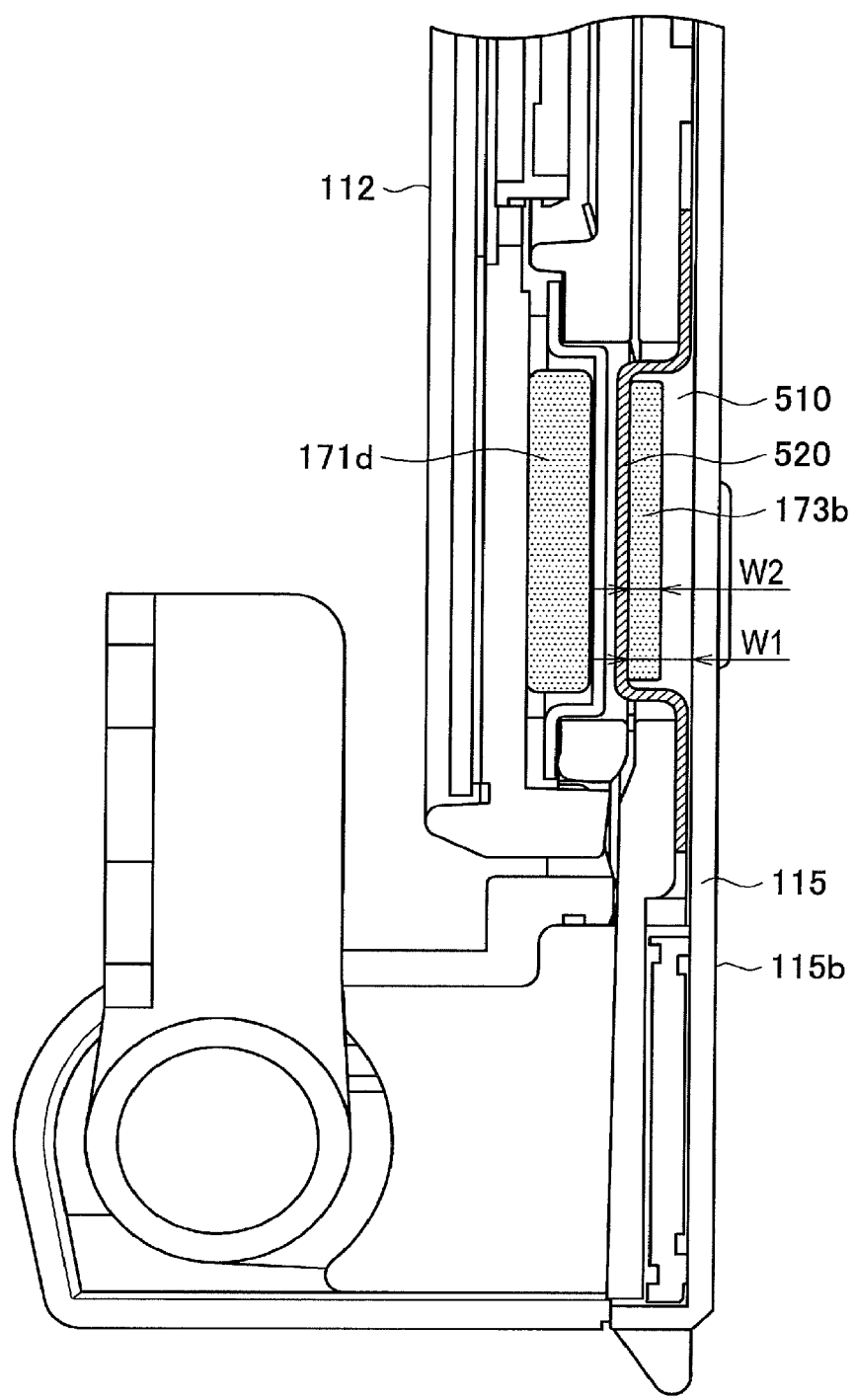
FIG. 45 is a figure for describing an arrangement state of a magnet 173b according to the fifth embodiment.
Figure 46:
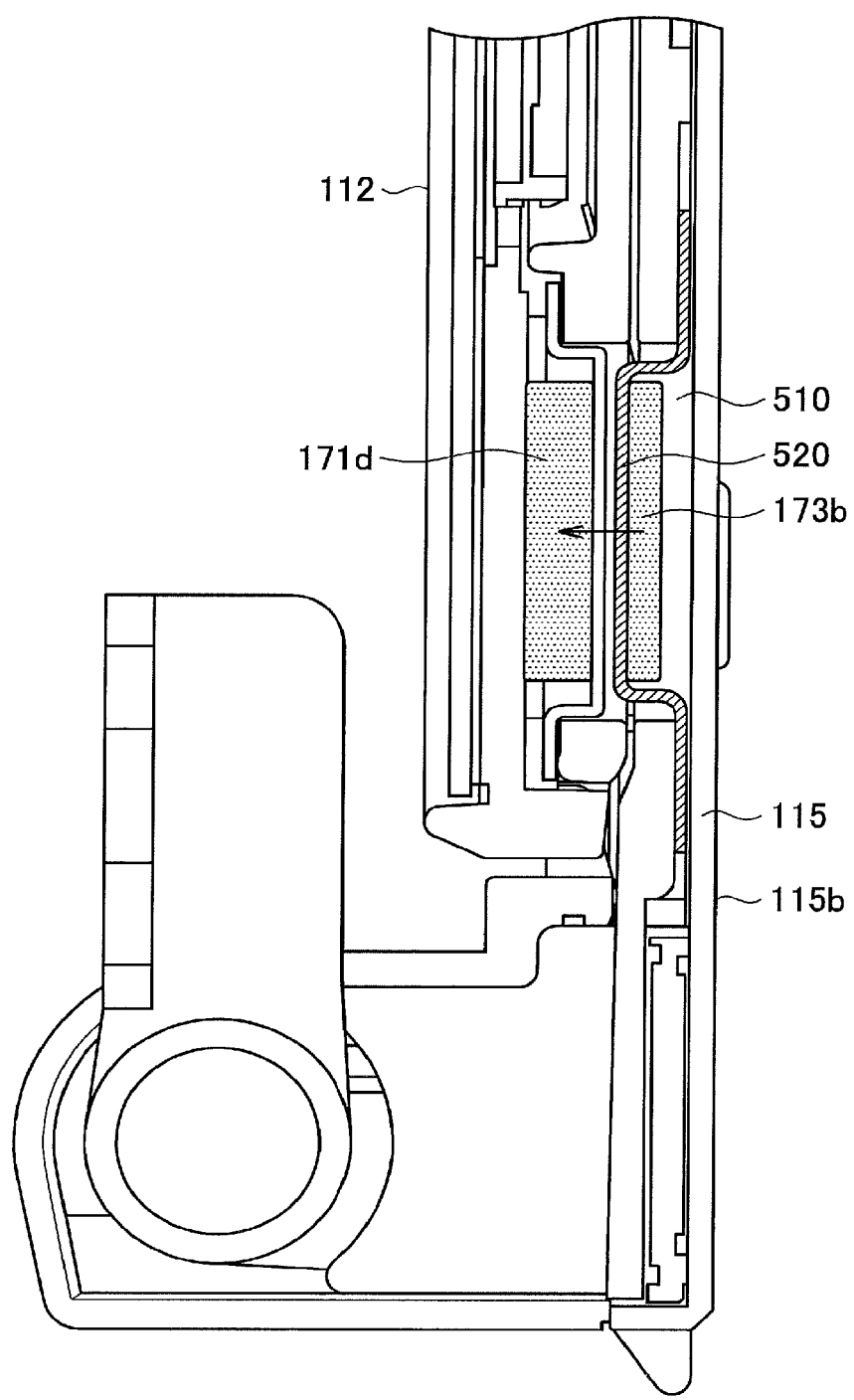
FIG. 46 is a figure which shows a state of the magnet 173b when the display section 112 is positioned in a standard position.
Figure 47:
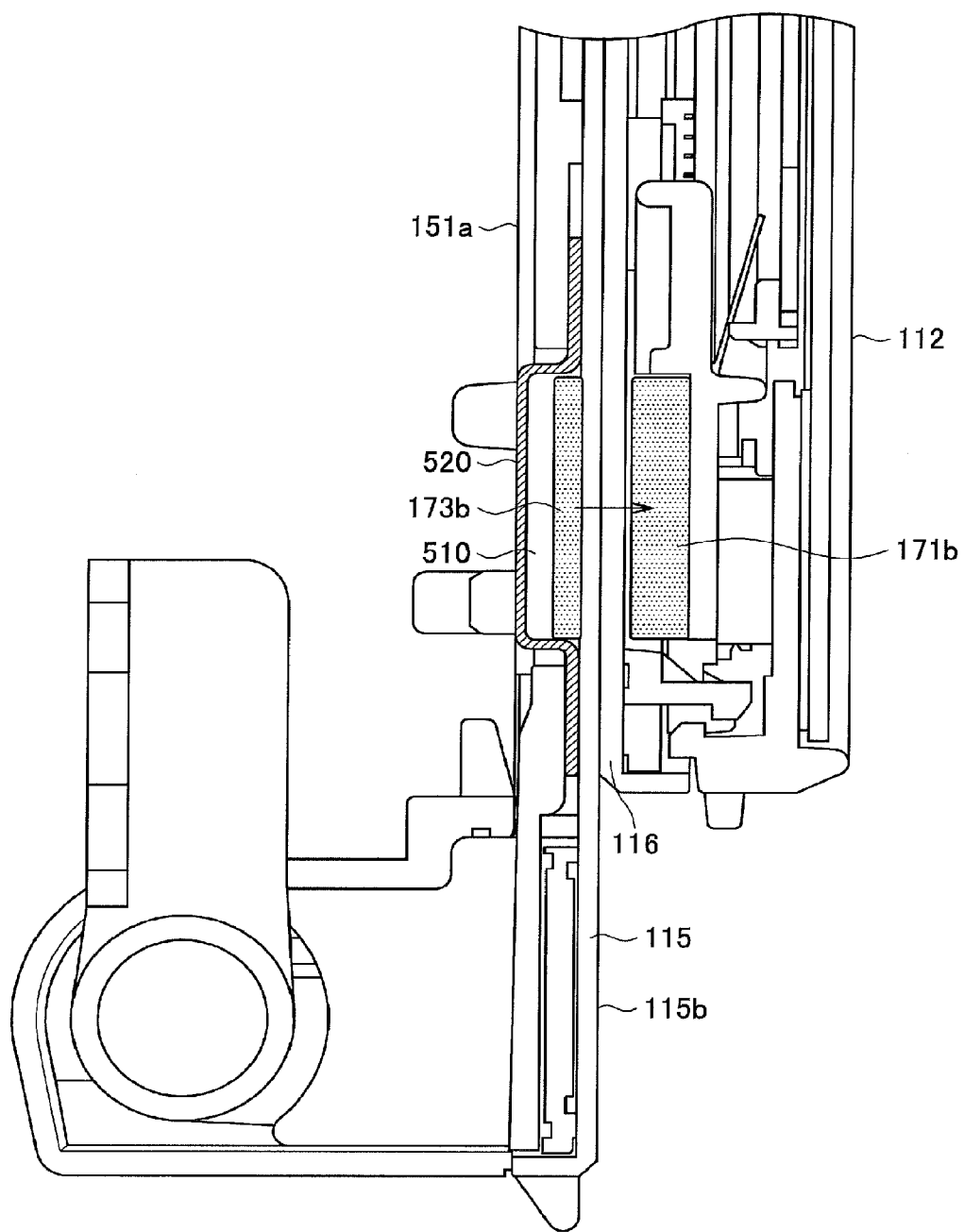
FIG. 47 is a figure which shows a state of the magnet 173b when the display section 112 is positioned in a reverse position.

FIG. 44 is a figure for describing retention by magnets of the display section 112 according to the fifth embodiment. FIG. 45 is a figure for describing an arrangement state of the magnet 173b according to the fifth embodiment. FIG. 46 is a figure which shows a state of the magnet 173b when the display section 112 is positioned in the standard position. FIG. 47 is a figure which shows a state of the magnet 173b when the display section 112 is positioned in the reverse position.

As described in the first embodiment, the display side housing 110 of the electronic apparatus 100 has magnets 171a, 171b, 171c and 171d (FIG. 15), and the main body side housing 120 has magnets 172a and 172b (FIG. 15). Further, the first support section 115 has magnets 173a and 173b (FIG. 22). Also, as shown in FIG. 44, the display section 112 retains the standard position by an attractive force between the magnet 171d of the display side housing 110 and the magnet 173b of the first support section 115. Further, the display section 112 retains the reverse position by an attractive force (magnetic force) between the magnet 171b and the magnet 173b of the display side housing 110. Note that, in the fifth embodiment, the magnet 173b corresponds to a first magnet.

In the fifth embodiment, the magnet 173b is included capable of being shifted in the thickness direction of the first support section 115. Specifically, while the magnet 173b is arranged in a space 510 of the first support section 115, a width W2 of the thickness direction of the magnet 173b is smaller than a width W1 of the thickness direction of the space 510, such as shown in FIG. 45. Therefore, it becomes possible for the magnet 173b to shift in the thickness direction within the space 510.

As shown in FIG. 46, when the display section 112 is positioned in the standard position, the magnet 173b is drawn towards the magnet 171d included in the display section 112, and is retained on a first surface 151a side of the first support section 115. That is, since the magnet 173b approaches the magnet 171d, the retention force which allows the display section 112 to be positioned in the standard position will become stronger. Therefore, a strong retention force can be secured even if the magnet 173b is small.

On the other hand, as shown in FIG. 47, when the display section 112 is positioned in the reverse position, the magnet 173b is drawn towards the magnet 171b included in the display section 112, and is retained on a second surface 151b side on the opposite side to the first surface of the first support section 115. That is, since the magnet 173b approaches the magnet 171b, the retention force which allows the display section 112 to be positioned in the reverse position will become stronger. Therefore, by having the magnet 171b positioned on the second surface 151b side separated from the main body side housing 120, it becomes difficult for the magnetic force to have an adverse affect on a hard disk built into the main body side housing 120.

Further, the magnet 173b is covered by a cover plate 520 which is a cover member. The cover plate 520 has magnetism. Therefore, when the display section 112 rotates between the standard position and the reverse position, the magnet 173b is attracted to the cover plate 520. As a result, sounds by the magnet 173b shifting within the space 510, when the display section 112 shifts between the standard position and the reverse position, can be prevented.

6. The Sixth Embodiment

An example of the configuration of the electronic apparatus 100 according to a sixth embodiment of the present disclosure will be described with reference to FIG. 48 to FIG. 50.

Figure 48:
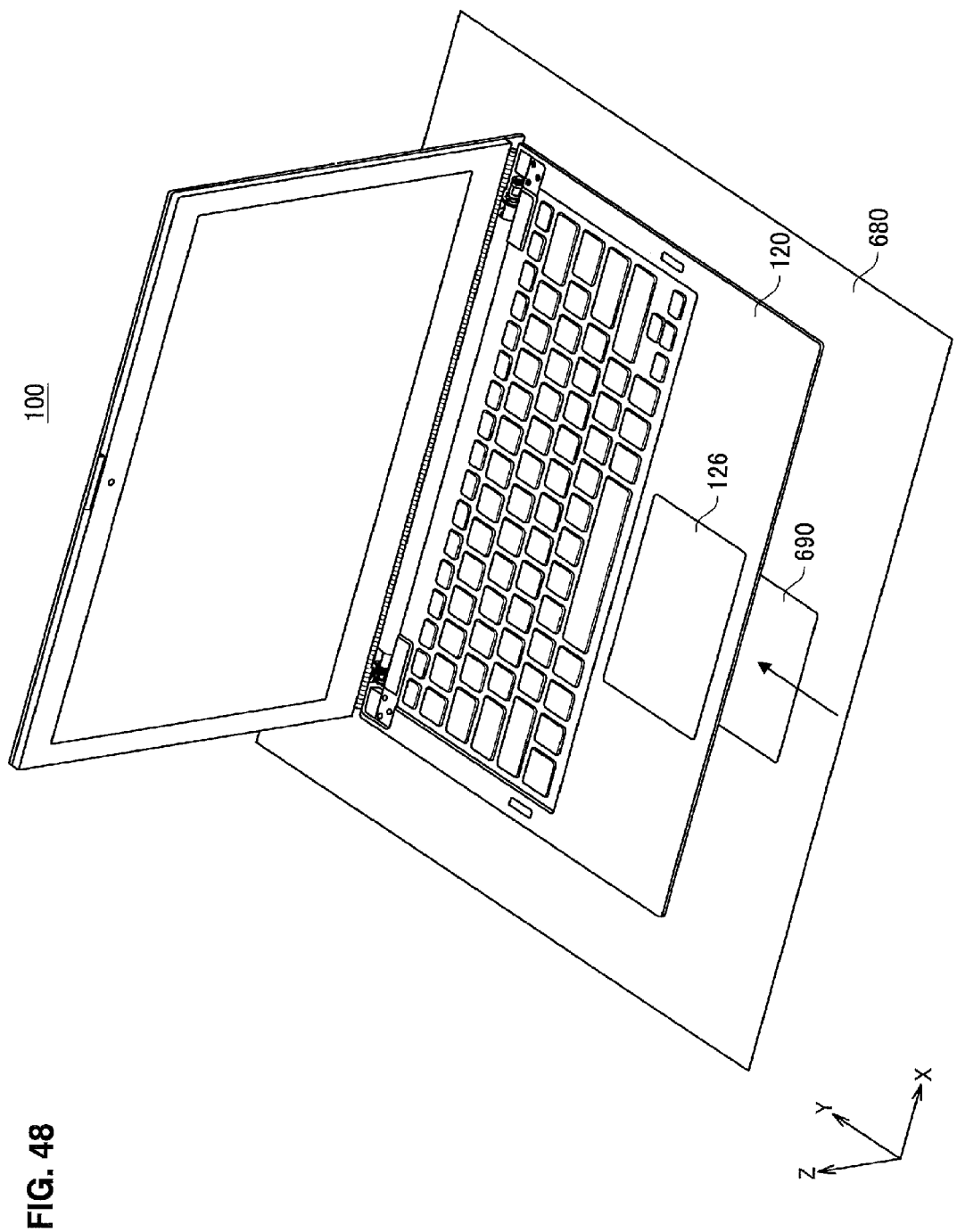
FIG. 48 is a figure for describing a reading method of a contactless IC card according to a sixth embodiment of the present disclosure.

FIG. 48 is a figure for describing a reading method of a contactless IC card according to the sixth embodiment. The electronic apparatus 100 according to the sixth embodiment reads a contactless IC card 690, by having a user insert the contactless IC card 690 into a space between the main body side housing 120 of the electronic apparatus 100 and a placement surface 680, on which the electronic apparatus 100 is placed, such as shown in FIG. 48. The contactless IC card 690 is, for example, a recording medium such as an NFC card.

Figure 49:
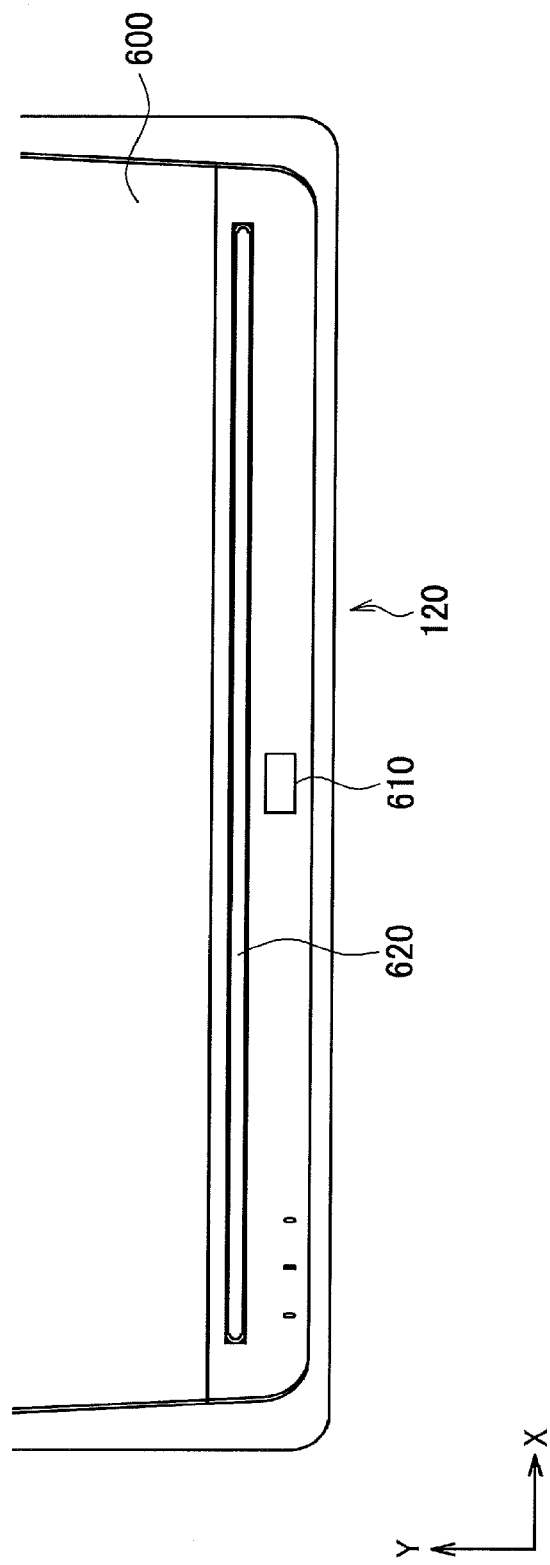
FIG. 49 is a figure which shows a bottom surface side of the main body side housing 120 of the electronic apparatus 10 according to the sixth embodiment.
Figure 50:
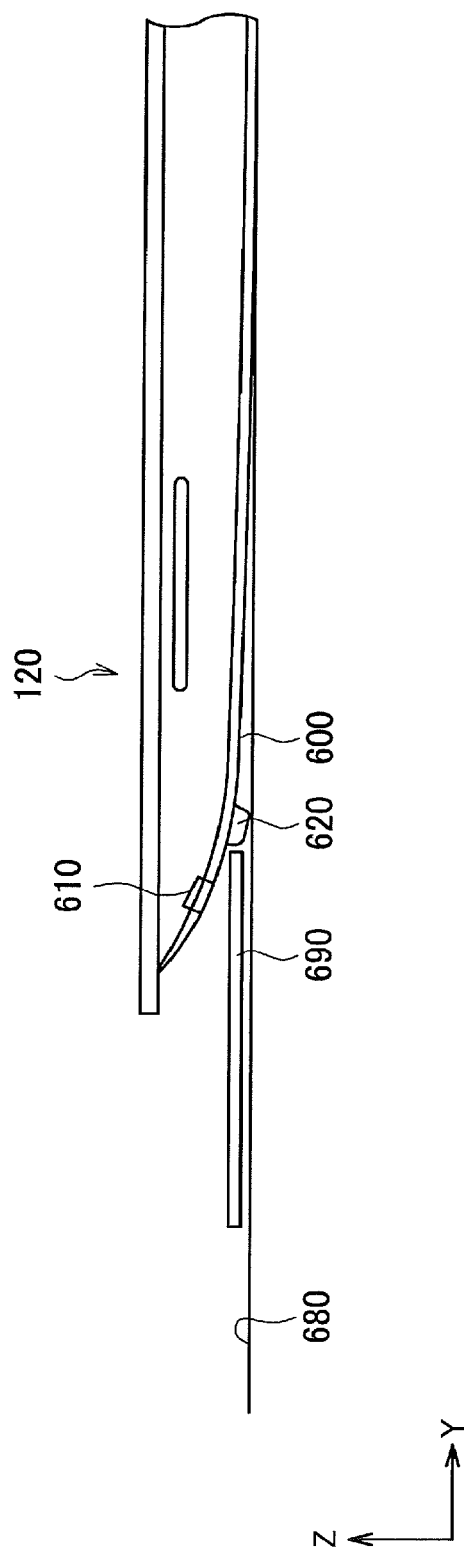
FIG. 50 is a figure which shows a restriction for the reading position of a contactless IC card 690 by rubber legs 620 according to the sixth embodiment.

FIG. 49 is a figure which shows a bottom surface side of the main body side housing 120 of the electronic apparatus 10 according to the sixth embodiment. FIG. 50 is a figure which shows a restriction for the reading position of the contactless IC card 690 by rubber legs 620 according to the sixth embodiment. As shown in FIG. 49, the electronic apparatus 100 according to the sixth embodiment has a reading section 610 and rubber legs 620 on the bottom surface 600 of the main body side housing 120.

The reading section 610 is positioned on the side opposite to a touch pad 126 of the main body side housing 120 (refer to FIG. 48). That is, when viewed from the user, the reading section 610 is positioned on the end section of the front side of the short direction, on the bottom surface 600 of the main body side housing 120. The reading section 610 reads the contactless IC card 690 inserted into the reading position between the main body side housing 120 and the placement surface 680.

The rubber legs 620 are included convexly surrounding the reading section 610. Specifically, the rubber legs 620 are formed so as to protrude from the bottom surface 600, along the long direction of the main body side housing 120. In this way, when the electronic apparatus 10 is placed on the placement surface 680, the rubber legs 620 come into contact with the placement surface 680. Further, the rubber legs 620 are included at positions which come into contact with the contactless IC card 690 inserted up to the position at which the reading section 610 is read. In other words, the rubber legs 620 restrict the position of the inserted contactless IC card 690. In this way, since the contactless IC card 690 can be guided to the reading position, even if it is difficult for the user to view the reading section 610, the reading section 610 can appropriately read the contactless IC card 690.

It should be understood by those skilled in the art that various modifications, combinations, sub-combinations and alterations may occur depending on design requirements and other factors insofar as they are within the scope of the appended claims or the equivalents thereof.

While the a description has been made above in which a notebook personal computer is included as an example of the above described electronic apparatus, the electronic apparatus is not limited to this. For example, the electronic apparatus may be a game machine, an electronic dictionary or the like which has a housing capable of rotating via connection sections.

Further, the effect described in the present disclosure is not limited to only that described or illustrated. That is, the technology according to the present disclosure accomplishes other effects which are clear to a person skilled in the art from the description of the present disclosure, along with the above described effect or instead of the above described effect.

Additionally, the present technology may also be configured as below.
(1) An electronic apparatus, including:
  a first housing;
  a second housing which has a display section and a support member supporting the display section; and
  a housing connection section which rotatably connects the second housing with respect to the first housing;
  wherein the support member includes
    a first support section connected to the housing connection section,
    a second support section which fixedly supports the display section, and
    a support connection section, positioned between the first support section and the second support section, which has a flexibility to rotatably connect the second support section with respect to the first support section.
(2) The electronic apparatus according to (1),
  wherein the first support section and the second support section are support plates which support a rear surface side of the display section, and
  wherein a thickness of the first support section is a same as a thickness of the second support section.
(3) The electronic apparatus according to (1) or (2),
  wherein the support connection section is sandwiched between the display section and the first support section and the second support section.
(4) The electronic apparatus according to any one of (1) to (3),
  wherein the support connection section is a sheet shaped member,
  wherein one end side of the support connection section is fixed to the first support section, and
  wherein the other end side of the support connection section is fixed to the second support section.
(5) The electronic apparatus according to (4),
  wherein the support connection section is formed by a rubber or an elastomer.
(6) The electronic apparatus according to any one of (1) to (5), further including:
  a planar wiring cable connected between the first housing and the second housing,
  wherein the wiring cable is arranged so as to pass through the inside of the support connection section.
(7) The electronic apparatus according to (6),
  wherein a short direction of the support connection section bends when the second support section is rotated with respect to the first support section, and
  wherein a long direction of the wiring cable is diagonal with respect to the short direction of the support connection section inside the support connection section.
(8) The electronic apparatus according to (7), further including:
  wires which pass through the inside of end parts of a long direction of the support connection section.
(9) The electronic apparatus according to any one of (1) to (8), further including:
  a driving substrate of the display section,
  wherein the driving substrate is provided on a rear surface of the display section, and at a position facing the second support section.
(10) The electronic apparatus according to any one of (1) to (9),
  wherein the first support section has magnets which retain the display section by magnetic force when the support connection section is not bent.
(11) The electronic apparatus according to any one of (1) to (10),
  wherein the housing connection section has hinge mechanisms which include rotation shafts.
(12) The electronic apparatus according to (11),
  wherein the housing connection section has a torque variation section which allows a rotation torque to be changed in accordance with a rotation angle when the second housing is rotated with respect to the first housing.
(13) The electronic apparatus according to any one of (1) to (12),
  wherein the display section has a display screen, and
  wherein the electronic apparatus further includes:
    a wireless communication section, positioned on the display screen side of the first housing, which performs near distance wireless communication.
(14) The electronic apparatus according to any one of (1) to (13), wherein in a case where the support connection section is in a state of not being bent and the second housing is in a closed state with respect to the first housing, the display section faces a main surface of the first housing, and wherein in a case where the support connection section is in a state of being bent and the second housing is in a closed state with respect to the first housing, the support member faces the main surface of the first housing.

(15) The electronic apparatus according to any one of (1) to (6), wherein the support member includes sheet shaped energization members which passes through the inside of end parts of a long direction of the support connection section, and wherein the energization members connect the second support section to the first support section.

(16) The electronic apparatus according to any one of (1) to (15), wherein the display section rotates between a support position supported by the first support section and a separation position separated from the first support section, and wherein the first support section has a seizing section which seizes the second support section when the display section is positioned in the support position.

(17) The electronic apparatus according to any one of (1) to (16), wherein the display section rotates between a support position supported by the first support section and a separation position separated from the first support section, and wherein the electronic apparatus further includes:

a locking section which shifts between a locking position allowing the display section positioned in the support position to be locked, and an opening position in which the display section is capable of rotating from the support position to the separation position; and a restriction section which restricts shifting to the locking position of the locking section, when the display section is shifted from the support position in a state in which the locking section is positioned in the opening position.

(18) The electronic apparatus according to any one of (1) to (17), wherein the first support section includes a first magnet provided to be capable of shifting in a thickness direction, wherein when the display section faces a first surface of the first support section, the display section is retained at the first surface side by an attractive force between the first magnet and a magnet provided in the display section, and wherein when the display section faces a second surface on an opposite side to the first surface of the first support section, the display section is retained at the second surface side by an attractive force between the first magnet and the magnet provided in the display section.

(19) The electronic apparatus according to (18), wherein the first support section includes a cover member which covers the first magnet, and wherein the cover member has magnetism.

(20) The electronic apparatus according to any one of (1) to (19), further including:

a reading section that is provided on a bottom surface of the first housing and reads a recording medium; and a restriction section that is provided convexly surrounding the reading section on the bottom surface and restricts a reading position of the recording medium.

What is claimed is:

1. An electronic apparatus, comprising:
a housing which has a display section and a support member supporting the display section;
wherein the support member includes
a first support section which separately supports the display section,
a second support section which fixedly supports the display section, and
a support connection section, positioned between the first support section and the second support section, which has a flexibility to rotatably connect the first support section with respect to the second support section, the support connection section being formed separately from the first and second support sections.

2. The electronic apparatus according to claim 1, wherein the first support section and the second support section are support plates which support a rear surface side of the display section, and wherein a thickness of the first support section is equal to a thickness of the second support section.

3. The electronic apparatus according to claim 1, wherein the first support section and the second support section make a flat plate when the first support section contacts with a rear surface side of the display section.

4. The electronic apparatus according to claim 1, wherein the first support section is rotatable over an angle of 90 degrees or obtusely with respect to a rear surface side of the display section.

5. The electronic apparatus according to claim 1, wherein the first support section is rotatable at an angle of 180 degrees with respect to a rear surface side of the display section.

6. The electronic apparatus according to claim 1, wherein the support connection section is sandwiched between the display section and both the first support section and the second support section.

7. The electronic apparatus according to claim 6, wherein the support connection section is formed by a rubber or an elastomer.

8. The electronic apparatus according to claim 7, further comprising: wires which pass through insides of end parts of a long direction of the support connection section.

9. The electronic apparatus according to claim 1, wherein the support connection section is a sheet shaped member wherein one end side of the support connection section is fixed to the first support section, and wherein the other end side of the support connection section is fixed to the second support section.

10. The electronic apparatus according to claim 1, further comprising: a driving substrate of the display section, wherein the driving substrate is provided on a rear surface of the display section, and at a position facing the second support section.

11. The electronic apparatus according to claim 1, wherein the first support section has magnets which retain the display section by magnetic force when the support connection section contacts with a rear surface side of the display section.

12. The electronic apparatus according to claim 1, further comprising a second housing and a housing connection section which rotatably connects the housing with respect to the second housing.

* * * * *